(12) United States Patent
Horio et al.

(10) Patent No.: US 11,329,488 B2
(45) Date of Patent: May 10, 2022

(54) POWER CONVERSION SYSTEM, METHOD FOR CONTROLLING CONVERTER CIRCUIT, AND PROGRAM

(71) Applicant: PANASONIC INTELLECTUAL PROPERTY MANAGEMENT CO., LTD., Osaka (JP)

(72) Inventors: Wataru Horio, Osaka (JP); Hiroyuki Fujii, Nara (JP); Kenji Hanamura, Osaka (JP); Kota Maeba, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/258,092

(22) PCT Filed: Jun. 19, 2019

(86) PCT No.: PCT/JP2019/024184
§ 371 (c)(1),
(2) Date: Jan. 5, 2021

(87) PCT Pub. No.: WO2020/012892
PCT Pub. Date: Jan. 16, 2020

(65) Prior Publication Data
US 2021/0288504 A1    Sep. 16, 2021

(30) Foreign Application Priority Data

Jul. 10, 2018  (JP) .............................. JP2018-130334
Aug. 30, 2018  (JP) .............................. JP2018-162119

(51) Int. Cl.
*H02J 3/46*  (2006.01)
*H02J 1/10*  (2006.01)
(Continued)

(52) U.S. Cl.
CPC .............. *H02J 3/466* (2020.01); *H02J 1/109* (2020.01); *H02J 1/12* (2013.01); *H02J 3/381* (2013.01);
(Continued)

(58) Field of Classification Search
CPC ...................................................... H02J 3/466
See application file for complete search history.

(56) References Cited

U.S. PATENT DOCUMENTS

| 9,966,761 B1 | 5/2018 | Kim et al. |
| 2012/0049635 A1 | 3/2012 | Schelenz et al. |

(Continued)

FOREIGN PATENT DOCUMENTS

| JP | 2010-213479 A | 9/2010 |
| JP | 2014-050156 A | 3/2014 |

(Continued)

OTHER PUBLICATIONS

International Search Report and Written Opinion issued in International Patent Application No. PCT/JP2019/024184, dated Sep. 10, 2019; with partial English translation.

(Continued)

*Primary Examiner* — Daniel Kessie
(74) *Attorney, Agent, or Firm* — McDermott Will & Emery LLP

(57) ABSTRACT

The converter circuit includes an inverter. The converter circuit receives DC power from a DC power supply (such as a solar cell or a storage battery unit), has the DC power converted into AC power by at least the inverter, and outputs the AC power to a load or a power grid. When acquiring information that two or more types of power curtailment causes have arisen, a control circuit makes the converter circuit limit power output to a maximum degree of power curtailment out of two or more degrees of power curtailment (Continued)

according to specifics of the two or more types of power curtailment causes.

12 Claims, 9 Drawing Sheets

(51) Int. Cl.
*H02J 1/12* (2006.01)
*H02J 3/38* (2006.01)
*H02J 3/32* (2006.01)

(52) U.S. Cl.
CPC ............ *H02J 3/32* (2013.01); *H02J 2300/24* (2020.01); *H02J 2310/52* (2020.01); *H02J 2310/60* (2020.01)

(56) References Cited

U.S. PATENT DOCUMENTS

| 2012/0065803 | A1 | 3/2012 | Teichmann et al. | |
| 2013/0030587 | A1 | 1/2013 | El-Barbari et al. | |
| 2016/0285267 | A1* | 9/2016 | Stone | H02J 3/32 |
| 2016/0315475 | A1 | 10/2016 | Carlson et al. | |
| 2018/0138829 | A1* | 5/2018 | Baba | H02J 3/383 |

FOREIGN PATENT DOCUMENTS

| JP | 2014-187783 A | 10/2014 |
| JP | 2015-073368 A | 4/2015 |
| JP | 2016-082718 A | 5/2016 |
| JP | 2017-135889 A | 8/2017 |

OTHER PUBLICATIONS

Australian Office Action dated Aug. 20, 2021, issued in corresponding Australian Patent Application No. 2019300646.
Extended European Search Report dated Dec. 1, 2021 issued in corresponding European Patent Application No. 19834814.6.

* cited by examiner

Steady State

Power Curtailment

FIG. 3A

| Item | Cause of Power Curtailment | Limit Value | Response Rate |
|---|---|---|---|
| 1 | Current Rating Exceeded | Current Rating | High |
| 2 | Power Rating Exceeded | Power Rating | High |
| 3 | Output Voltage Increased | Follow the Output Voltage | Medium |
| 4 | Remote Output Instruction | Instruction Value | Instruction Value |
| 5 | Abnormally High Temperature | Follow the Temperature | Low |

Second Power Converter: Not Connected

FIG. 3B

| Item | Cause of Power Curtailment | Limit Value | Response Rate |
|---|---|---|---|
| 1 | Reverse Power Flow to Grid | Setting | High |
| 2 | Current Rating Exceeded | Current Rating | High |
| 3 | Power Rating Exceeded | Power Rating | High |
| 4 | Output Voltage Increased | Follow the Output Voltage | Medium |
| 5 | Remote Output Instruction | Instruction Value | Instruction Value |
| 6 | Abnormally High Temperature | Follow the Temperature | Low |

Second Power Converter: Connected

POWER CONVERSION SYSTEM, METHOD FOR CONTROLLING CONVERTER CIRCUIT, AND PROGRAM

CROSS-REFERENCE OF RELATED APPLICATIONS

This application is the U.S. National Phase under 35 U.S.C. § 371 of International Patent Application No. PCT/JP2019/024184, filed on Jun. 19, 2019, which in turn claims the benefit of Japanese Application No. 2018-162119, filed on Aug. 30, 2018 and Japanese Application No. 2018-130334, filed on Jul. 10, 2018, the entire disclosures of which Applications are incorporated by reference herein.

TECHNICAL FIELD

The present disclosure generally relates to a power conversion system, a method for controlling a converter circuit, and a program, and more particularly relates to a power conversion system for converting DC power into AC power, a method for controlling a converter circuit included in the power conversion system, and a program.

BACKGROUND ART

Examples of distributed power supplies (DC power supplies) to be interconnected to a power grid include solar cells, fuel cells, stationary storage batteries, and onboard storage batteries as power supply sources. Typical examples of distributed power supply systems to be interconnected to a power grid include a configuration in which a single distributed power supply is used to be interconnected to the power grid via a DC-DC converter, a DC bus, and an inverter and a configuration in which a plurality of distributed power supplies are used to be interconnected to the power grid via their respective DC-DC converters, a common DC bus, and a single inverter (see, for example, Patent Literature 1).

Such a distributed power supply system needs to perform power curtailment control in compliance with the grid interconnection protocol to establish connection with the power grid and also perform power curtailment control to avoid generating an overcurrent or an abnormally high temperature for the purpose of safe operation.

Unless the power curtailment control is performed properly in accordance with curtailment instructions given from various causes for curtailment, the distributed power supply system would lose power balance as the system as a whole.

CITATION LIST

Patent Literature

Patent Literature 1: JP 2015-73368 A

SUMMARY OF INVENTION

In view of the foregoing background, it is therefore an object of the present disclosure to provide a power conversion system, a method for controlling a converter circuit, and a program, all of which are configured or designed to perform power curtailment control properly, whenever any of various types of power curtailment causes arises.

A power conversion system according to an aspect of the present disclosure includes a converter circuit and a control circuit. The converter circuit includes an inverter. The inverter converts DC power into AC power. The converter circuit receives DC power from a DC power supply, has the DC power converted into AC power by at least the inverter, and outputs the AC power to a load or a power grid. The control circuit controls the converter circuit. When acquiring information that a single type of power curtailment cause has arisen, the control circuit makes the converter circuit limit power output to a varying degree of power curtailment according to specifics of the single type of power curtailment cause. When acquiring information that two or more types of power curtailment causes have arisen, the control circuit makes the converter circuit limit power output to a maximum degree of power curtailment out of two or more degrees of power curtailment according to respective specifics of the two or more types of power curtailment causes.

A power conversion system according to another aspect of the present disclosure includes a first power converter and a second power converter. The first power converter includes an inverter and a DC bus. The inverter converts DC power supplied from a storage battery unit into AC power and outputs the AC power to a load or a power grid. The DC bus serves as a line connected to the inverter. The second power converter includes a DC-DC converter. The DC-DC converter is connected between the storage battery unit and the DC bus. The DC-DC converter charges and discharges the storage battery unit. At least one of the first power converter or the second power converter includes at least a part of a control circuit. The control circuit controls a converter circuit including the inverter and the DC-DC converter. When acquiring information that a single type of power curtailment cause has arisen, the control circuit makes the converter circuit limit power output to a varying degree of power curtailment according to specifics of the single type of power curtailment cause. When acquiring information that two or more types of power curtailment causes have arisen, the control circuit makes the converter circuit limit power output to a maximum degree of power curtailment out of two or more degrees of power curtailment according to respective specifics of the two or more types of power curtailment causes.

A method for controlling a converter circuit according to still another aspect of the present disclosure is a method for controlling a converter circuit including an inverter to convert DC power into AC power. The converter circuit receives DC power from a DC power supply, has the DC power converted into AC power by at least the inverter, and outputs the AC power to a load or a power grid. The method for controlling the converter circuit includes the steps of: making, when acquiring information that a single type of power curtailment cause has arisen, the converter circuit limit power output to a varying degree of power curtailment according to specifics of the single type of power curtailment cause; and making, when acquiring information that two or more types of power curtailment causes have arisen, the converter circuit limit power output to a maximum degree of power curtailment out of two or more degrees of power curtailment according to respective specifics of the two or more types of power curtailment causes.

A program according to yet another aspect of the present disclosure is designed to cause a computer system to perform the method for controlling a converter circuit described above.

BRIEF DESCRIPTION OF DRAWINGS

FIG. 3A shows exemplary types of power curtailment causes that may arise when a second power converter of the power conversion system is not connected to the DC bus;

FIG. 3B shows exemplary types of power curtailment causes that may arise when the second power converter is connected to the DC bus;

DESCRIPTION OF EMBODIMENTS

Figure 1:
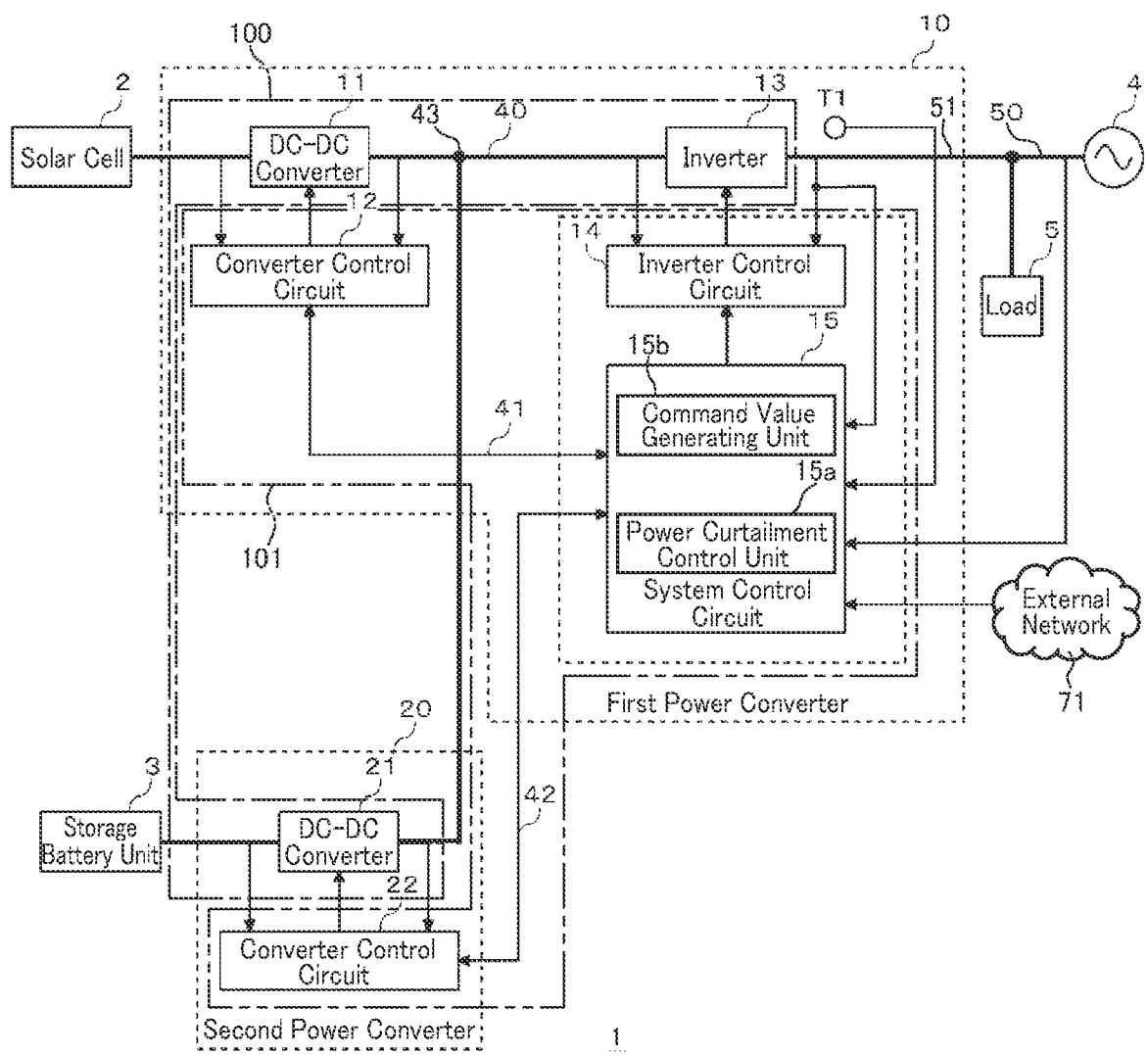
FIG. 1 illustrates a power conversion system according to an exemplary embodiment of the present disclosure.

FIG. 1 illustrates a power conversion system 1 according to an exemplary embodiment of the present disclosure. The power conversion system 1 includes a first power converter 10 and a second power converter 20.

The power conversion system 1 is connected to a solar cell 2 (as a DC power supply), a storage battery unit 3 (as another DC power supply), a commercial power grid (grid 4), and a load 5. The first power converter 10 is implemented as a power conditioner system for the solar cell 2. The second power converter 20 is a DC-DC converter system for the storage battery unit 3. In the example illustrated in FIG. 1, the DC-DC converter system for the storage battery unit 3 is connected to the power conditioner system for the solar cell 2.

The solar cell 2 is a power generator for transforming optical energy directly into electricity by using the photovoltaic effect. As the solar cell 2, a silicon solar cell, a solar cell made of a material such as a compound semiconductor, or a dye-sensitized solar cell (organic solar cell) may be used, for example. The solar cell 2 is connected to the first power converter 10 and outputs the electricity generated to the first power converter 10.

The first power converter 10 includes a DC-DC converter 11, a converter control circuit 12, an inverter 13, a temperature sensor T1, an inverter control circuit 14, and a system control circuit 15. The system control circuit 15 includes a power curtailment control unit 15a and a command value generating unit 15b.

The second power converter 20 includes a DC-DC converter 21. The DC-DC converter 11 and the inverter 13 are connected together via a DC bus 40 (line). An electrical path extended from a branching point 43 between the DC-DC converter 11 and the inverter 13 is connected to the DC-DC converter 21.

The converter control circuit 12 and the system control circuit 15 are connected together via a communications line 41. The converter control circuit 12 and the system control circuit 15 establish communication in compliance with a predetermined serial communications protocol (such as the RS-485 protocol or the TCP-IP protocol).

The DC-DC converter 11 converts the DC power supplied from the solar cell 2 into DC power with a desired voltage value and outputs the DC power thus converted to the DC bus 40. More specifically, the DC-DC converter 11 converts the DC power supplied from the solar cell 2 and output the DC power thus converted to the inverter 13 via the DC bus 40. The DC-DC converter 11 may be implemented as, for example, a booster chopper.

The converter control circuit 12 controls the DC-DC converter 11. The converter control circuit 12 performs, as a basic type of control, maximum power point tracking (MPPT) control on the DC-DC converter 11 to maximize the power output of the solar cell 2. Specifically, the converter control circuit 12 estimates the power generated by the solar cell 2 by measuring the input voltage and input current of the DC-DC converter 11 respectively corresponding to the output voltage and output current of the solar cell 2. The converter control circuit 12 generates a command value to set the power generated by the solar cell 2 at a maximum power point (optimum operating point) based on the measured output voltage of the solar cell 2 and the estimated power generated. By giving the command value, the converter control circuit 12 specifies the output voltage, output current, or power output value of the DC-DC converter 11, for example. The converter control circuit 12 searches for the maximum power point by varying the operating point voltage of the DC-DC converter 11 by a predetermined step width by the hill climbing method, for example, and generates the command value to maintain the maximum power point. More specifically, the converter control circuit 12 generates the command value at regular time intervals. The DC-DC converter 11 performs pulse width modulation (PWM) control based on the command value thus generated and performs switching operation in accordance with a drive signal obtained by the PWM control.

The converter control circuit 12 measures the input current and input voltage of the DC-DC converter 11 at a first measuring point. The converter control circuit 12 measures the output current and output voltage of the DC-DC converter 11 at a second measuring point. The first measuring point is located on an electrical path between the DC-DC converter 11 and the solar cell 2. The second measuring point is located on an electrical path extended from the output terminal of the DC-DC converter 11. More specifically, the second measuring point is located at a point on the DC bus 40 between the DC-DC converter 11 and the branching point 43.

The converter control circuit 12 measures the output voltage of the solar cell 2, i.e., the input voltage of the DC-DC converter 11, at the first measuring point. The converter control circuit 12 also measures the output current of the solar cell 2, i.e., the input current of the DC-DC converter 11, at the first measuring point. The converter control circuit 12 measures the output voltage of the DC-DC converter 11 at the second measuring point. The converter control circuit 12 also measures the output current of the DC-DC converter 11 at the second measuring point.

The inverter 13 is a bidirectional inverter. The inverter 13 converts the DC power supplied through the DC bus 40 into AC power and outputs the AC power thus converted to the commercial power grid (hereinafter simply referred to as the "grid 4"). More specifically, the inverter 13 converts the DC power supplied from the solar cell 2 and the storage battery unit 3 through the DC bus 40 into AC power and outputs the AC power thus converted to the grid 4. More specifically, the inverter 13 outputs the AC power to the grid 4 via a power line 50 connected to the grid 4. A distribution board is provided between the power line 50 and the inverter 13. A load 5 is connected to an electrical path 51 between the distribution board and the inverter 13. The inverter 13 also supplies the AC power to the load 5. In addition, the inverter 13 converts AC power supplied from the grid 4 into DC power and outputs the DC power thus converted to the DC bus 40. More specifically, the inverter 13 outputs the DC power thus converted to the storage battery unit 3 via the DC bus 40. A smoothing electrolytic capacitor is connected to the DC bus 40.

The inverter control circuit 14 controls the inverter 13. As a basic type of control, the inverter control circuit 14 controls the inverter 13 such that the voltage on the DC bus 40 maintains a first threshold voltage Vibt (see FIG. 5).

Specifically, first, the inverter control circuit 14 detects a bus voltage Vb (see FIG. 5) that is the voltage on the DC bus 40. The system control circuit 15 generates a command value to bring the bus voltage Vb detected by the inverter control circuit 14 in agreement with a first threshold voltage Vibt. By giving the command value, the system control circuit 15 specifies the output voltage, output current, or power output of the inverter 13, for example. The inverter control circuit 14 performs PWM control on the inverter 13 in accordance with the command value generated by the system control circuit 15. When finding the bus voltage Vb higher than the first threshold voltage Vibt while the inverter 13 is outputting DC power to the DC bus 40, the system control circuit 15 generates a command value to increase the duty cycle of a PWM signal in the inverter control circuit 14. On the other hand, when finding the bus voltage Vb lower than the first threshold voltage Vibt, the system control circuit 15 generates a command value to decrease the duty cycle of the PWM signal in the inverter control circuit 14.

The system control circuit 15 may limit the power output of the inverter 13 by outputting the command value to the inverter control circuit 14. The system control circuit 15 acquires information that a type of power curtailment cause has arisen in the power conversion system 1. If one or more types of power curtailment causes have arisen in the power conversion system 1 and information about that is acquired by the system control circuit 15, then the system control circuit 15 makes the inverter 13 curtail its power output to a varying degree of power curtailment according to the specifics of the one or more types of power curtailment causes.

As used herein, if "the system control circuit 15 acquires information that a type of power curtailment cause has arisen," then the system control circuit 15 may acquire such information from an external source or may detect by itself that the type of power curtailment cause has arisen.

Figure 5:
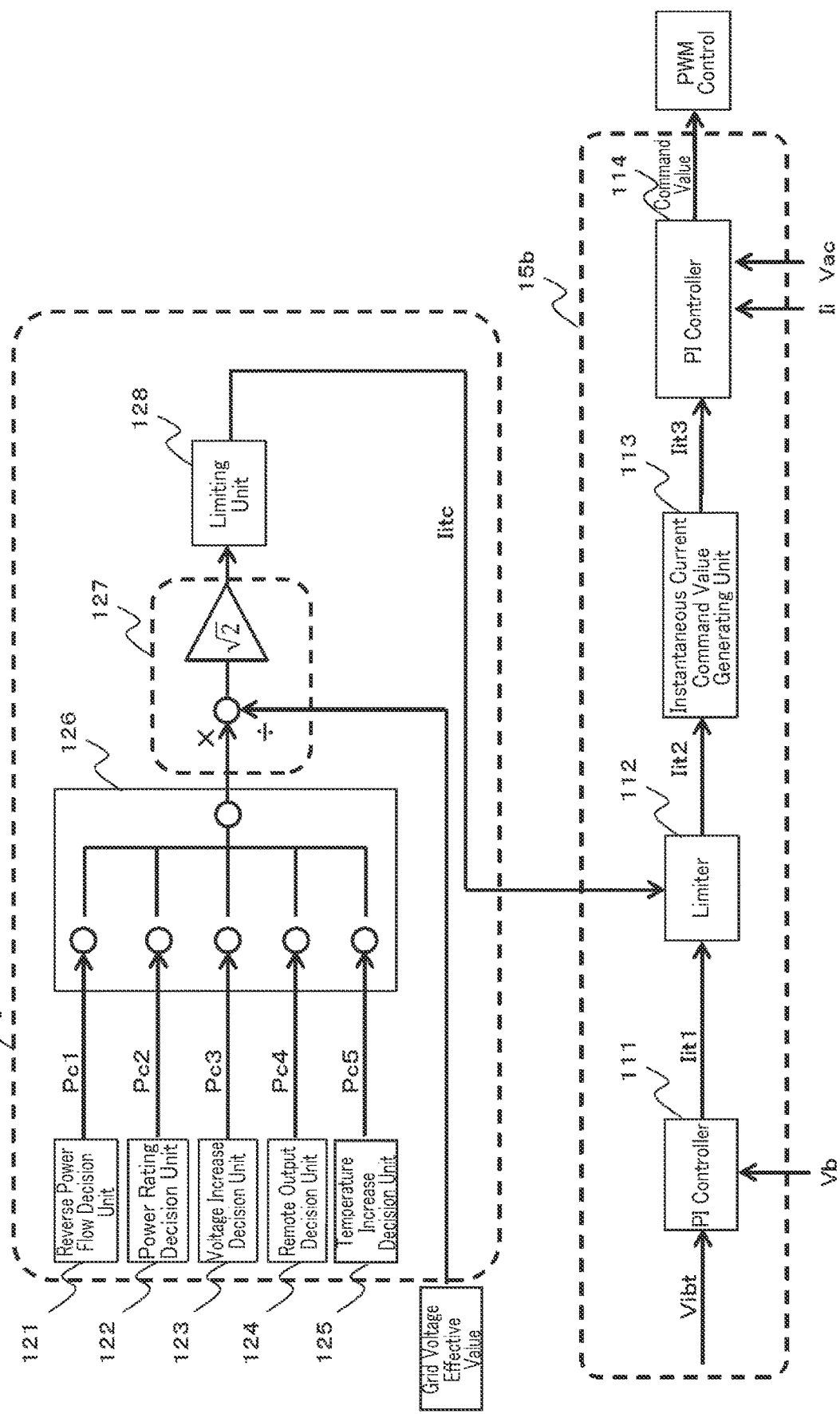
FIG. 5 is a control block diagram of an inverter in a power conversion system according to an exemplary embodiment of the present disclosure.

Next, it will be described how the system control circuit 15 generates the command value to be given to the inverter control circuit 14. As shown in FIG. 5, the system control circuit 15 includes the command value generating unit 15b and the power curtailment control unit 15a. The command value generating unit 15b generates a command value for the inverter control circuit 14 to bring the bus voltage Vb in agreement with the first threshold voltage Vibt. The command value generating unit 15b will be described first, and the power curtailment control unit 15a will be described later.

The command value generating unit 15b includes a proportional integral (PI) controller 111, a limiter 112, an instantaneous current command value generating unit 113, and another PI controller 114. The PI controller 111 receives the bus voltage Vb on the DC bus 40 (see FIG. 1). In addition, the PI controller 111 also receives the first threshold voltage Vibt to be compared with the bus voltage Vb. The PI controller 111 calculates a provisional current command value Iit1 (peak value) for the inverter 13 to bring the bus voltage Vb in agreement with the first threshold voltage Vibt. That is to say, if the inverter control circuit 14 controls the inverter 13 based on the provisional current command value Iit1, then the bus voltage Vb becomes equal to the first threshold voltage Vibt. In this description, if two values are "equal to each other," then the two values may naturally be exactly equal to each other but this phrase also refers to a situation where the ratio of the two values falls within the range from 0.9 to 1.1, for example.

The provisional current command value Iit1 is provided from the PI controller 111 to the limiter 112. The limiter 112 is provided by the power curtailment control unit 15a with information about the upper and lower limit values of the current to be output from the inverter 13 under the control of the inverter control circuit 14. In the following description, a value of a current flowing from the inverter 13 toward the grid 4 is supposed to be positive and a value of a current flowing from the inverter 13 toward the DC bus 40 is supposed to be negative. The upper limit value is a positive value and the lower limit value is a negative value. Note that the upper limit value is calculated and set by the power curtailment control unit 15a. More specifically, the upper limit value is determined by the power curtailment control unit 15a according to the specifics of one or more types of power curtailment causes that have arisen in the power conversion system 1. The lower limit value may be a fixed value, for example.

The limiter 112 determines whether or not the provisional current command value Iit1 falls within the range from the upper limit value to the lower limit value. When finding the provisional current command value Iit1 falling outside of the range from the upper limit value to the lower limit value, the limiter 112 makes the provisional current command value Iit1 fall within that range (by setting the provisional current command value Iit1 at the upper limit value if the value Iit1 is over the upper limit value or setting the provisional current command value Iit1 at the lower limit value if the value Iit1 is under the lower limit value) and outputs that value as a current command value Iit2 (peak value). When finding the provisional current command value Iit1 falling within the range from the upper limit value to the lower limit value, the limiter 112 outputs the provisional current command value Iit1 as a current command value Iit2.

The instantaneous current command value generating unit 113 receives the current command value Iit2 from the limiter 112. The instantaneous current command value generating unit 113 calculates an instantaneous current command value Iit3 based on the current command value Iit2.

The PI controller 114 receives the instantaneous current command value Iit3, the output current Ii of the inverter 13, and a grid voltage Vac and calculates a command value based on these values. More specifically, the PI controller 114 receives the instantaneous current command value Iit3, the output current Ii of the inverter 13, and the grid voltage Vac and calculates a command value that makes the output current value of the inverter 13 equal to the instantaneous current command value Iit3. The inverter control circuit 14 performs PWM control on the inverter 13 based on the command value calculated by the PI controller 114.

In FIG. 1, the temperature sensor T1 detects the temperature in the first power converter 10 and outputs the detection value to the system control circuit 15. The detection value of the temperature sensor T1 is used for the power curtailment control unit 15a of the system control circuit 15 to determine the degree of power curtailment of the power output of the inverter 13 as will be described later. As the temperature sensor T1, a thermistor, a thermocouple, or any other suitable sensing device may be used, for example.

The storage battery unit 3 may be charged with electricity and discharge the electricity stored therein. The storage battery unit 3 may include at least one storage battery selected from the group consisting of a lithium-ion storage battery, a nickel-hydrogen storage battery, a lead storage battery, an electric double layer capacitor, and a lithium-ion capacitor. The storage battery unit 3 is connected to the second power converter 20.

The second power converter 20 includes a DC-DC converter 21 and a converter control circuit 22. The converter control circuit 22 and the system control circuit 15 of the first power converter 10 are connected together via a communications line 42. The converter control circuit 22 and the system control circuit 15 establish communication in compliance with a predetermined serial communications protocol.

The converter control circuit 22 measures the input/output currents and input/output voltages of the DC-DC converter 21 at a third measuring point. The converter control circuit 22 also measures the input/output currents and input/output voltages of the DC-DC converter 21 at a fourth measuring point. The third measuring point is located on an electrical path between the DC-DC converter 21 and the storage battery unit 3. The fourth measuring point is located on the DC bus 40 between the DC-DC converter 21 and the branching point 43.

The DC-DC converter 21 is connected between the storage battery unit 3 and the DC bus 40. In other words, the storage battery unit 3 is connected to the DC bus 40 via the DC-DC converter 21. The DC-DC converter 21 is a bidirectional converter. The DC-DC converter 21 charges the storage battery unit 3 with electricity. That is to say, the DC-DC converter 21 converts the DC power supplied from the solar cell 2 and the inverter 13 and outputs the DC power thus converted to the storage battery unit 3. In addition, the DC-DC converter 21 also makes the storage battery unit 3 discharge the electricity stored there. That is to say, the DC-DC converter 21 converts the DC power supplied from the storage battery unit 3 and outputs the DC power thus converted to the inverter 13. The converter control circuit 22 controls the DC-DC converter 21. As a basic type of control, the converter control circuit 22 performs PWM control on the DC-DC converter 21 in accordance with the command value transmitted from the system control circuit 15, thereby charging and discharging the storage battery unit 3 with a constant current (CC) or a constant voltage (CV). In this embodiment, the converter control circuit 22 turns the input/output quantities of the DC-DC converter 21 into either constant currents or constant voltages by performing feedback control based on the current and voltage values measured at the third and fourth measuring points.

More specifically, as a basic type of control, the converter control circuit 22 performs PWM control on the DC-DC converter 21 such that the quantity of electricity (power) discharged from the storage battery unit 3 to the DC-DC converter 21 or the quantity of electricity (power) with which the storage battery unit 3 is charged from the DC-DC converter 21 is equal to the command value provided by the system control circuit 15. For example, at the time of discharging, the converter control circuit 22 receives a signal including a power command value from the system control circuit 15, divides the power command value by the voltage in the storage battery unit 3 to obtain a current command value, and controls the DC-DC converter 21 and makes the storage battery unit 3 discharge a constant current using the current command value.

In the power conversion system 1 described above, the first power converter 10 includes some constituent elements of a converter circuit 100 for converting power and some constituent elements of a control circuit 101 for controlling the converter circuit 100. The second power converter 20 includes other constituent elements of the converter circuit 100 and other constituent elements of the control circuit 101.

The converter circuit 100 includes the inverter 13. The converter circuit 100 further includes the DC-DC converter 11 and the DC-DC converter 21. The inverter 13, DC-DC converter 11, and DC-DC converter 21 of the converter circuit 100 are distributed in the first power converter 10 and the second power converter 20. Specifically, the inverter 13 and the DC-DC converter 11 are provided for the first power converter 10 and the DC-DC converter 21 is provided for the second power converter 20.

The control circuit 101 includes the inverter control circuit 14, the system control circuit 15, the converter control circuit 12, and the converter control circuit 22. These circuits are distributed in the first power converter 10 and the second power converter 20. Specifically, the inverter control circuit 14, the system control circuit 15, and the converter control circuit 12 are provided for the first power converter 10, and the converter control circuit 22 is provided for the second power converter 20. Also, the inverter control circuit 14 and the system control circuit 15 are integrated together, but the converter control circuit 12 is provided separately from the inverter control circuit 14 and the system control circuit 15.

If the electricity generated by the solar cell 2 increases due to a variation in insolation or the power consumption of the load 5 decreases while electricity is being discharged from the storage battery unit 3, then a reverse power flow to the grid 4 may be generated to establish an electric power selling state. In Japan, the grid interconnection protocol prohibits an electric power corresponding to 5% or more of the rated capacity of a storage battery from flowing back from the storage battery system to the grid 4 for more than 500 ms. Thus, if a reverse power flow corresponding to 5% or more of the rated capacity of the storage battery included in the storage battery unit 3 is detected in the power conversion system 1 to which the storage battery unit 3 is connected, then the reverse power flow should be stopped within 500 ms. That is to say, the power output from the converter circuit 100 to the grid 4 should be limited.

In addition, in Japan, the amendment in January 2015 to the renewable energy feed-in tariff (FIT) scheme made it mandatory to introduce a remote power control (power curtailment) system into a solar power generation facility and wind power generation facility to be newly interconnected to the power grid. The system control circuit 15 receives an instruction signal about the power curtailment with respect to the grid 4 and output timing from a grid-operating company such as a utility power supply company over an external network 71 (such as the Internet or a dedicated line). In that case, the converter circuit 100 needs to have its power output limited in accordance with the instruction signal. That is to say, at least one of the inverter 13, DC-DC converter 11, or DC-DC converter 21 of the converter circuit 100 needs to have its power output limited.

Examples of methods for limiting the power output of the converter circuit 100 include a method of using the DC-DC converter 11 for the solar cell 2 to limit the power output, a method of using the DC-DC converter 21 for the storage battery unit 3 to limit the power output, and a method of using the inverter 13 to limit the power output. The method of using the DC-DC converter 11 for the solar cell 2 to limit the power output could involve a waste of the electricity generated by the solar cell 2. That is why the power curtailment using the DC-DC converter 21 for the storage battery unit 3 and the power curtailment using the inverter 13 are preferred to the power curtailment using the DC-DC converter 11 for the solar cell 2.

When any reverse power flow is detected, the power output from the DC-DC converter 21 for the storage battery unit 3 to the DC bus 40 may be limited to reduce the power output from the converter circuit 100 to the grid 4. If the second power converter 20 is separated from the first power converter 10 and installed at a located distant from the grid 4, however, then a time lag is often caused between the detection of the reverse power flow and the power curtailment on the DC-DC converter 21. In this embodiment, the two power converters, namely, the first power converter 10 and the second power converter 20, are used as an example. However, this is only an example of the present disclosure and should not be construed as limiting. Optionally, the number of power converters provided may be increased. Nevertheless, as the number of power converters provided increases, the communication traffic also increases to make the communication cycle between the respective power converters so long as to cause a time lag often before the power curtailment is done.

In the power conversion system 1, the system control circuit 15 of the first power converter 10 detects any reverse power flow based on a measured value of a current transformer (CT) sensor provided closer to the grid 4 than the distribution board on the power line 50. The converter control circuit 22 of the second power converter 20 receives information about the reverse power flow detected from the system control circuit 15 through the communications line 42. The communications line 42 is often installed along the DC bus 40 that connects the first power converter 10 and the second power converter 20 together. According to this configuration, the communications line 42 is affected by noise from the DC bus 40. In addition, in digital communication using binary voltage, the shorter the unit time representing one bit is, the more susceptible to noise the digital communication tends to be. Thus, basically, the higher the communication rate is, the more frequently bit errors will be caused.

That is why according to the method in which the first power converter 10 detects any reverse power flow, generates communication data instructing power curtailment, and transmits the communication data to the second power converter 20 via the communications line 42 to make the DC-DC converter 21 limit power output, the reverse power flow could not be eliminated within the time limit (of 500 ms) prescribed by the grid interconnection protocol. In addition, the content of the communication data could change due to noise.

Thus, in this power conversion system 1, the inverter 13 limits the power output first, and then the DC-DC converter 21 limits the power output. As described above, as a basic type of control, the inverter control circuit 14 controls the inverter 13 such that the voltage on the DC bus 40 (i.e., the bus voltage Vb) maintains the first threshold voltage Vibt. When the system control circuit 15 acquires information that one or more types of power curtailment causes have arisen, the inverter control circuit 14 performs power curtailment control. Specifically, in performing the power curtailment control, the inverter control circuit 14 controls the inverter 13 to prevent the output of the inverter 13 from exceeding a command value generated by the system control circuit 15 (specifically, either an upper limit current value or an upper limit power value). That is to say, the power curtailment control performed by the inverter control circuit 14 makes the inverter 13 limit the power output. The power curtailment control is given a higher priority to the basic control of maintaining the bus voltage Vb at the first threshold voltage Vibt. That is to say, the inverter control circuit 14 suspends the basic control while performing the power curtailment control.

At a point in time when the inverter 13 starts limiting the power output, the DC-DC converter 11 for the solar cell 2 and/or the DC-DC converter 21 for the storage battery unit 3 has not started limiting the power output yet. This causes the power input to the inverter 13 to surpass the power output from the inverter 13 to the DC bus 40, thus causing an increase in voltage on the DC bus 40. In other words, the power supplied from the grid 4 to the inverter 13 becomes greater than the power delivered from the inverter 13 to the DC bus 40 to cause an increase in bus voltage Vb. More specifically, electric charges are going to be stored in the electrolytic capacitor connected to the DC bus 40.

Figure 7:
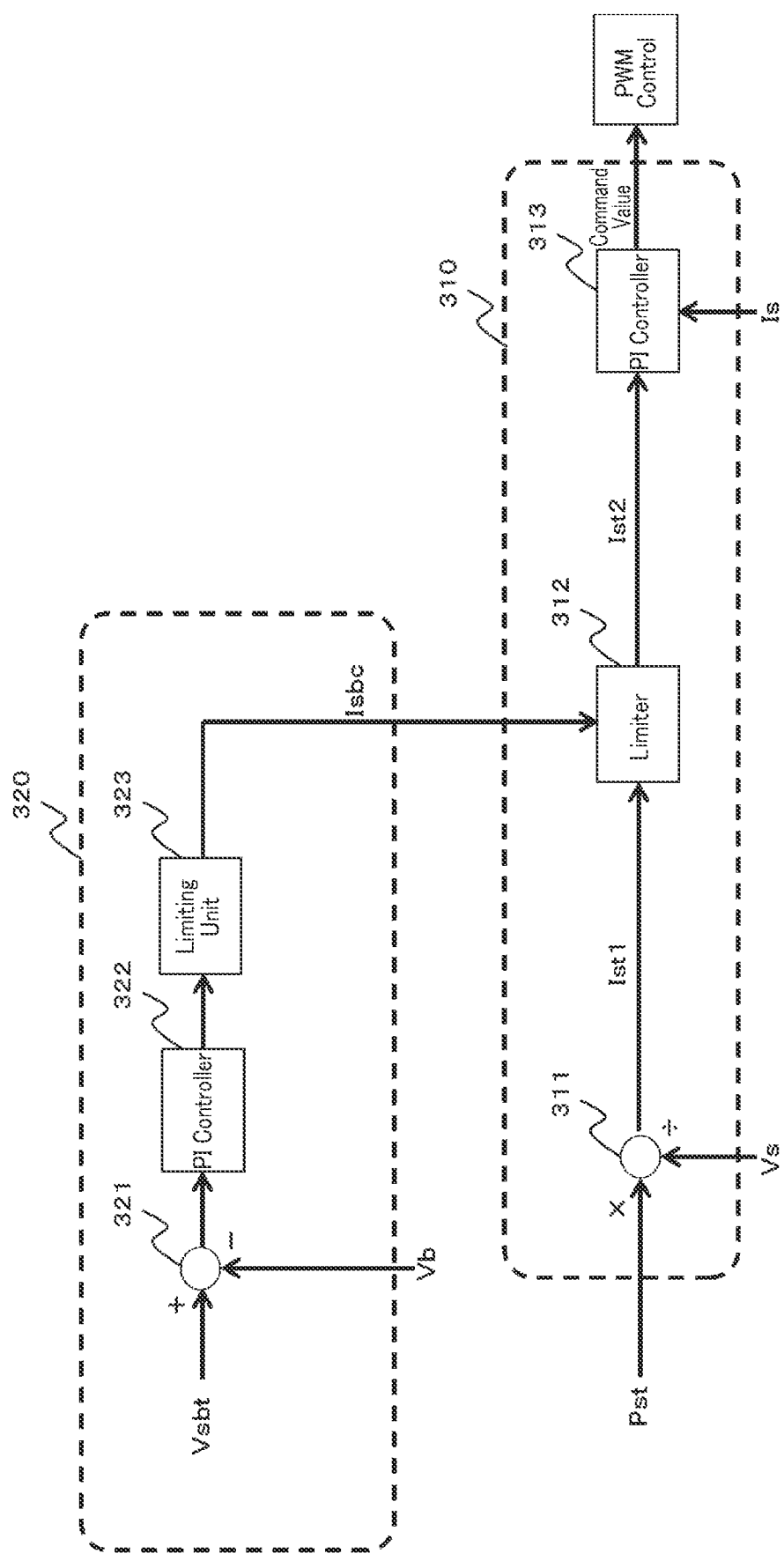
FIG. 7 is a control block diagram of a DC-DC converter for a storage battery unit in the power conversion system.

Next, it will be described with reference to FIG. 7 how the converter control circuit 22 for the storage battery unit 3 operates. As described above, as a basic type of control, the converter control circuit 22 controls the DC-DC converter 21 such that the quantity of electricity discharged from the storage battery unit 3 to the DC-DC converter 21 or the quantity of electricity with which the storage battery unit 3 is charged from the DC-DC converter 21 becomes equal to the command value transmitted from the system control circuit 15. In addition, the converter control circuit 22 sets an upper limit value to the output of the DC-DC converter 21 to limit the power output of the DC-DC converter 21 when the bus voltage Vb exceeds a second threshold voltage Vsbt.

The converter control circuit 22 includes a basic control unit 310 and a DC bus regulating control unit 320. The basic control unit 310 mainly performs the basic control. The DC bus regulating control unit 320 mainly sets an upper limit value to the output of the DC-DC converter 21.

The basic control unit 310 includes a power-current transformer unit 311, a limiter 312, and a PI controller 313. The power-current transformer unit 311 receives a power command value Pst from the system control circuit 15 and a storage battery unit voltage Vs from the storage battery unit 3. The power-current transformer unit 311 calculates a provisional current command value Ist1 by dividing the power command value Pst by the storage battery unit voltage Vs.

The limiter 312 is provided by the DC bus regulating control unit 320 with information about the upper and lower limit values of the current to be output to the DC bus 40 from the DC-DC converter 21 under the control of the converter control circuit 22. In the following description, a value of a current flowing from the DC-DC converter 21 toward the DC bus 40 is supposed to be positive and a value of a current flowing from the DC-DC converter 21 toward the storage battery unit 3 is supposed to be negative. The upper limit value is a positive value and the lower limit value is a negative value. The limiter 312 determines whether or not the provisional current command value Ist1 falls within the range from the upper limit value to the lower limit value. When finding the provisional current command value Ist1 falling outside of the range from the upper limit value to the lower limit value, the limiter 312 makes the provisional current command value Ist1 fall within that range (by setting the provisional current command value Ist1 at the upper limit value if the value Ist1 is over the upper limit value or setting the provisional current command value Ist1 at the lower limit value if the value Ist1 is under the lower limit value) and outputs that value as a current command value Ist2. When finding the provisional current command value Ist1 falling within the range from the upper limit value to the lower limit value, the limiter 312 outputs the provisional current command value Ist1 as a current command value Ist2. The upper limit value is calculated and set by the DC bus regulating control unit 320. The lower limit value may be a fixed value, for example.

The PI controller 313 receives the current command value Ist2 and the storage battery unit current Is representing the amount of current to be supplied to, or delivered from, the storage battery unit 3 and calculates a command value that makes the storage battery unit current Is equal to the current command value Ist2. The converter control circuit 22 performs PWM control on the DC-DC converter 21 using the command value calculated by the PI controller 313.

The DC bus regulating control unit 320 includes a subtractor 321, a PI controller 322, and a limiter 323. The subtractor 321 receives the second threshold voltage Vsbt and the bus voltage Vb, calculates their difference (Vsbt−Vb), and provides the difference (Vsbt−Vb) to the PI controller 322. Then, based on this difference, the PI controller 322 calculates a provisional upper limit value (i.e., the upper limit value of a current supplied to the DC bus 40 from the DC-DC converter 21 under the control of the converter control circuit 22) and outputs the provisional upper limit value thus calculated to the limiter 323. To prevent the bus voltage Vb from exceeding a predetermined threshold voltage greater than the second threshold voltage Vsbt, if the difference (Vsbt−Vb) is negative, the provisional upper limit value is suitably set such that the greater the absolute value of the difference is, the lower the provisional upper limit value becomes. On the other hand, if the difference (Vsbt−Vb) is positive, the provisional upper limit value is suitably set at a value equal to the current (latest) upper limit value. Once the bus voltage Vb exceeds the second threshold voltage Vsbt, the provisional upper limit value decreases compared to its value before the bus voltage Vb exceeds the second threshold voltage Vsbt.

When finding the provisional upper limit value falling outside of a predetermined range (e.g., a value greater than the rating of the DC-DC converter 21), the limiter 323 sets an upper limit value that falls within the predetermined range and outputs that value as an upper limit value Isbc to the limiter 312. When finding the provisional upper limit value falling within the predetermined range, the limiter 323 outputs the provisional upper limit value as the upper limit value Isbc to the limiter 312.

As can be seen, in the DC bus regulating control unit 320, once the bus voltage Vb exceeds the second threshold voltage Vsbt, the provisional upper limit value decreases from the value before the bus voltage Vb exceeds the second threshold voltage Vsbt. Consequently, the upper limit value Isbc decreases and the DC-DC converter 21 operates at an output equal to or less than the upper limit value Isbc. That is to say, once the bus voltage Vb exceeds the second threshold voltage Vsbt, the converter control circuit 22 starts performing the control of reducing an increase in the bus voltage Vb. This reduces the chances of the bus voltage Vb exceeding a predetermined threshold voltage greater than the second threshold voltage Vsbt. The second threshold voltage Vsbt is set at a value higher than the first threshold voltage Vibt.

Figure 6:
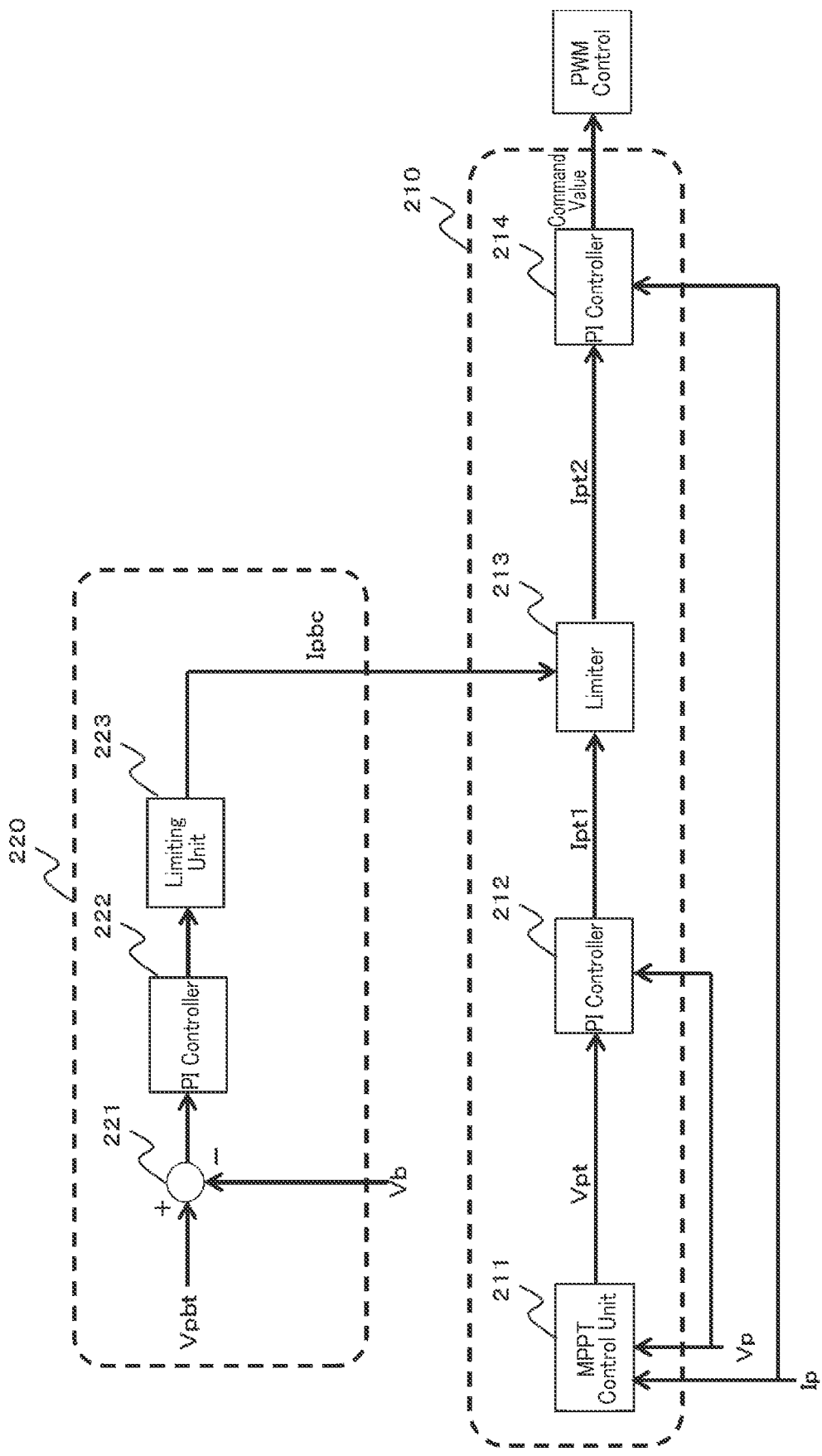
FIG. 6 is a control block diagram of a DC-DC converter for a solar cell in the power conversion system.

Next, it will be described with reference to FIG. 6 how the converter control circuit 12 for the solar cell 2 operates. As described above, as a basic type of control, the converter control circuit 12 performs MPPT control on the DC-DC converter 11 such that the power output of the solar cell 2 becomes maximum. In addition, the converter control circuit 12 sets an upper limit value to the output of the DC-DC converter 11 to limit the power output of the DC-DC converter 11 when the bus voltage Vb exceeds a third threshold voltage Vpbt.

The converter control circuit 12 includes a basic control unit 210 and a DC bus regulating control unit 220. The basic control unit 210 mainly performs the MPPT control. The DC bus regulating control unit 220 mainly sets an upper limit value to the output of the DC-DC converter 11.

The basic control unit 210 includes an MPPT control unit 211, a PI controller 212, a limiter 213, and another PI controller 214. The MPPT control unit 211 receives the voltage Vp and current Ip of the solar cell 2. The MPPT control unit 211 calculates, based on these input values, a voltage command value Vpt for the solar cell 2 that maximizes the electricity generated by the solar cell 2.

The PI controller 212 receives the voltage command value Vpt for the solar cell 2 and the voltage Vp of the solar cell 2. The PI controller 212 calculates a provisional current command value Ipt1 for the solar cell 2 that makes the voltage Vp of the solar cell 2 equal to the voltage command value Vpt for the solar cell 2.

The limiter 213 is provided by the DC bus regulating control unit 220 with information about the upper and lower limit values of the current to be output to the DC bus 40 from the DC-DC converter 11 under the control of the converter control circuit 12. In the following description, a value of a current flowing from the DC-DC converter 11 to the DC bus 40 is supposed to be positive and a value of a current flowing from the DC-DC converter 11 to the solar cell 2 is supposed to be negative. The upper limit value is a positive value and the lower limit value is either zero or a positive value. When finding the provisional current command value Ipt1 falling outside of the range from the upper limit value to the lower limit value, the limiter 213 makes the provisional current command value Ipt1 fall within that range (by setting the provisional current command value Ipt1 at the upper limit value if the value Ipt1 is over the upper limit value or setting the provisional current command value Ipt1 at the lower limit value if the value Ipt1 is under the lower limit value) and outputs that value as a current command value Ipt2. When finding the provisional current command value Ipt1 falling within the range from the upper limit value to the lower limit value, the limiter 213 outputs the provisional current command value Ipt1 as a current command value Ipt2. The upper limit value is calculated and set by the DC bus regulating control unit 220. The lower limit value may be a fixed value, for example.

The PI controller 214 receives the current command value Ipt2 and the current Ip of the solar cell 2. The PI controller 214 calculates a command value that makes the current Ip of the solar cell 2 equal to the current command value Ipt2. The DC-DC converter 11 performs PWM control based on the command value calculated by the PI controller 214.

The DC bus regulating control unit 220 includes a subtractor 221, a PI controller 222, and a limiting unit 223. The subtractor 221 receives the third threshold voltage Vpbt and the bus voltage Vb, calculates their difference (Vpbt−Vb), and provides the difference to the PI controller 222. Then, based on this difference (Vpbt−Vb), the PI controller 322 calculates a provisional upper limit value (i.e., the upper limit value of a current supplied to the DC bus 40 from the DC-DC converter 11 under the control of the converter control circuit 12) and outputs the provisional upper limit value thus calculated to the limiting unit 223. To prevent the bus voltage Vb from exceeding a predetermined threshold voltage greater than the third threshold voltage Vpbt, if the difference is negative, the provisional upper limit value is suitably set such that the greater the absolute value of the difference is, the lower the provisional upper limit value becomes. On the other hand, if the difference is positive, the provisional upper limit value is suitably set at a value equal to the current (latest) upper limit value. Once the bus voltage Vb exceeds the third threshold voltage Vpbt, the provisional upper limit value decreases compared to its value before the bus voltage Vb exceeds the third threshold voltage Vpbt.

When finding the provisional upper limit value falling outside of a predetermined range (e.g., a value greater than the rating of the DC-DC converter 11), the limiting unit 223 sets an upper limit value that falls within the predetermined range and outputs that value as an upper limit value Ipbc to the limiter 213. When finding the provisional upper limit value falling within the predetermined range, the limiting unit 223 outputs the provisional upper limit value as the upper limit value Ipbc to the limiter 213.

As can be seen, in the DC bus regulating control unit 220, once the bus voltage Vb exceeds the third threshold voltage Vpbt, the provisional upper limit value decreases from the value before the bus voltage Vb exceeds the third threshold voltage Vpbt. Consequently, the upper limit value Ipbc decreases and the DC-DC converter 11 operates at an output equal to or less than the upper limit value Ipbc, That is to say, once the bus voltage Vb exceeds the third threshold voltage Vpbt, the converter control circuit 12 starts performing the control of reducing an increase in the bus voltage Vb. This reduces the chances of the bus voltage Vb exceeding a predetermined threshold voltage greater than the third threshold voltage Vpbt. The third threshold voltage Vpbt is set at a value higher than the second threshold voltage Vsbt.

As a basic type of control, the inverter control circuit 14 controls the inverter 13 such that the bus voltage Vb measured by the inverter control circuit 14 maintains the first threshold voltage Vibt. The first threshold voltage Vibt is set in advance at a value falling within a steady-state voltage range of the bus voltage Vb. For example, if the grid voltage is AC 200 V, then the first threshold voltage Vibt may be set at a value falling within the range from DC 290 V to DC 360 V.

As described above, at a point in time when the inverter 13 starts limiting the power output, the DC-DC converter 11 for the solar cell 2 and/or the DC-DC converter 21 for the storage battery unit 3 has not started limiting the power output yet. This causes the power supplied from the grid 4 to the inverter 13 to surpass the power delivered from the inverter 13 to the DC bus 40, thus causing an increase in the bus voltage Vb. More specifically, electric charges are going to be stored in the electrolytic capacitor connected to the DC bus 40.

When the bus voltage Vb exceeds the second threshold voltage Vsbt, the converter control circuit 22 for the storage battery unit 3 instructs the DC-DC converter 21 to start limiting the power output. Thus, the converter control circuit 22 controls the DC-DC converter 21 to prevent the bus voltage Vb from exceeding a predetermined threshold voltage greater than the second threshold voltage Vsbt. The second threshold voltage Vsbt is set at a value greater than the first threshold voltage Vibt. The second threshold voltage Vsbt may be set at 390 V, for example.

When the bus voltage Vb exceeds the third threshold voltage Vpbt, the converter control circuit 12 for the solar cell 2 instructs the DC-DC converter 11 to start limiting the power output. Thus, the converter control circuit 12 controls the DC-DC converter 11 to prevent the bus voltage Vb from exceeding a predetermined threshold voltage greater than the third threshold voltage Vpbt. The third threshold voltage Vpbt is set at a value greater than the second threshold voltage Vsbt. The third threshold voltage Vpbt may be set at 410 V, for example.

There is a time lag before the increase in the bus voltage Vb makes the DC-DC converter 11, 21 start limiting the power output since the inverter 13 has started limiting the power output. This reduces, even if instantaneous blackout happens in the power conversion system 1, the chances of the DC-DC converter 11, 21 starting limiting the power output before the recovery, thus curbing a decrease in bus voltage Vb at the time of the instantaneous blackout.

Figure 2A:
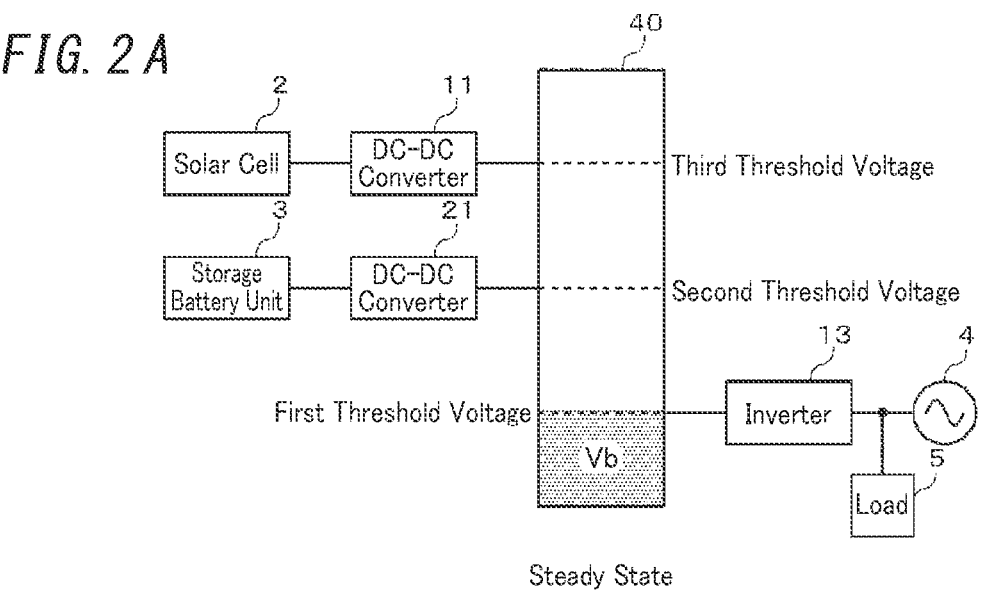
FIG. 2A schematically illustrates a state of voltage on a DC bus in the power conversion system.
Figure 2B:
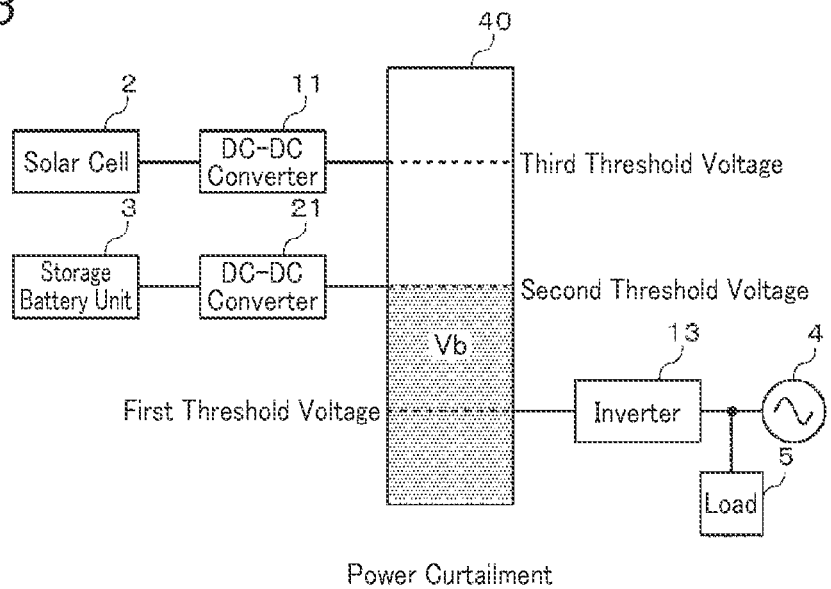
FIG. 2B schematically illustrates another state of the voltage on the DC bus in the power conversion system.

FIGS. 2A and 2B schematically illustrate respective states of the bus voltage Vb. In FIGS. 2A and 2B, the level of the shaded part corresponds to the magnitude of the bus voltage Vb. Specifically, FIG. 2A shows the level of the bus voltage Vb in a steady state. In the steady state, the bus voltage Vb is maintained by the inverter 13 at the first threshold voltage Vibt. When the bus voltage Vb increases to reach the second threshold voltage Vsbt, the DC-DC converter 21 for the storage battery unit 3 starts performing the control of reducing an increase in bus voltage Vb as shown in FIG. 2B. If the energy of the voltage increase on the DC bus 40 is greater than the energy of the control of reducing the voltage increase by the DC-DC converter 21 for the storage battery unit 3, then the voltage on the DC bus 40 further increases. In short, if the magnitude of increase in bus voltage Vb is greater than the magnitude of reduction in voltage increase by the DC-DC converter 21, the bus voltage Vb further increases. When the bus voltage Vb reaches the third threshold voltage Vpbt, the DC-DC converter 11 for the solar cell 2 starts performing the control of reducing the increase in bus voltage Vb.

In this case, the power curtailment by the DC-DC converter 11 in response to the increase in bus voltage Vb is performed under the control of the converter control circuit 12. The converter control circuit 12 makes the DC-DC converter 11 limit the power output according to the bus voltage Vb measured at the second measuring point. The DC-DC converter 11 is arranged closer to the converter control circuit 12 than to the system control circuit 15. This shortens the time it takes for the DC-DC converter 11 to start limiting the power output since the bus voltage Vb has increased, compared to a situation where the DC-DC converter 11 limits the power output in accordance with an instruction given by the system control circuit 15.

Likewise, the power curtailment by the DC-DC converter 21 in response to the increase in bus voltage Vb is performed under the control of the converter control circuit 22. The converter control circuit 22 makes the DC-DC converter 21 limit the power output according to the bus voltage Vb measured at the fourth measuring point. The DC-DC converter 21 is arranged closer to the converter control circuit 22 than to the system control circuit 15. This shortens the time it takes for the DC-DC converter 21 to start limiting the power output since the bus voltage Vb has increased, compared to a situation where the DC-DC converter 21 limits the power output in accordance with an instruction given by the system control circuit 15.

The power conversion system 1 is designed such that while the solar cell 2 is generating electricity at maximum power output, the DC-DC converter 21 is going to increase the degree of power curtailment to the point that the bus voltage Vb reaches the third threshold voltage Vpbt when the DC-DC converter 21 stops outputting power to the DC bus 40.

If the storage battery unit 3 is not fully charged when the bus voltage Vb increases, then the converter control circuit 22 may instruct the DC-DC converter 21 to charge the storage battery unit 3.

If the initial investment in the power conversion system 1 needs to be cut down, the power conversion system 1 may start being operated with only the first power converter 10 connected and without the second power converter 20 connected (i.e., as a solar power generation system). In addition, in the power conversion system 1, the second power converter 20 sometimes needs to be disconnected from the DC bus 40. For example, when the storage battery unit 3 is hardly used, disconnecting the second power converter 20 from the DC bus 40 may reduce the deterioration of the storage battery unit 3. Alternatively, if the storage battery unit 3 goes out of order, disconnecting the second power converter 20 from the DC bus 40 allows the first power converter 10 to be used continuously as a solar power generation system.

FIG. 3A shows exemplary types of power curtailment causes that may arise when the second power converter 20 is neither connected to the DC bus 40 nor one of the constituent elements of the power conversion system 1. FIG. 3B shows exemplary types of power curtailment causes that may arise when the second power converter 20 is connected to the DC bus 40 and one of the constituent elements of the power conversion system 1. As shown in FIG. 3A, when the second power converter 20 is not connected to the DC bus 40, there are five different types of power curtailment causes that may arise. It is the system control circuit 15 that determines whether or not any type of power curtailment cause has arisen.

The "current rating exceeded" is a type of power curtailment cause which is deemed to have arisen when the inverter 13 outputs a current (which may be a DC current or an AC current), of which the amount exceeds the current rating of the inverter 13. For example, if the output current rating of the inverter 13 is 27.5 A, this type of power curtailment cause is deemed to have arisen when the inverter 13 outputs a current in excess of 27.5 A.

The "power rating exceeded" is a type of power curtailment cause which is deemed to have arisen when the inverter 13 outputs power (which may be DC power or AC power) exceeding the power rating of the inverter 13. For example, if the output power rating of the inverter 13 is 5.5 kW, this type of power curtailment cause is deemed to have arisen when the inverter 13 outputs power in excess of 5.5 kW.

The "output voltage increased" is a type of power curtailment cause which is deemed to have arisen when the output voltage (which may be DC power or AC power) of the inverter 13 exceeds a predetermined value. If the output power is AC power, the predetermined value may be set at a value of 225 V or more in the case of three phases or a value of 107 V or more in the case of a single phase.

The "remote output instruction" is a type of power curtailment cause which is deemed to have arisen when the system control circuit 15 receives a signal including a power curtailment instruction from a grid-operating company such as a utility power supply company over the external network 71. The grid-operating company may transmit a signal including an instruction that reads, for example, "please limit power output to **kW for X minutes from XX: XX."

The "abnormally high temperature" is a type of power curtailment cause which is deemed to have arisen when the temperature in the first power converter 10 exceeds a predetermined temperature. The predetermined temperature may be set at 95° C., for example. A major heat source in the first power converter 10 is the inverter 13. It is the system control circuit 15 that determines, based on the detection value of the temperature sensor T1, whether or not the temperature is abnormally high.

On acquiring information that one or more types of power curtailment causes have arisen, the power curtailment control unit 15a of the first power converter 10 varies the degree of power curtailment of the inverter 13 according to the specifics of the one or more types of power curtailment causes. Specifically, the power curtailment control unit 15a determines a limit value and a response rate according to each type of power curtailment cause by reference to the table shown in FIG. 3A. When finding that the output of the inverter 13 has exceeded the limit value, the inverter control circuit 14 reduces the output of the inverter 13 to the limit value or less. That is to say, the smaller the limit value is, the greater the degree of power curtailment is. The unit of the limit value is determined by the type of the power curtailment cause. For example, the unit of the limit value may be the unit [W] of the power to be output to the grid 4, the unit [V] of the voltage to be output to the grid 4, or the unit [A] of the current to be output to the grid 4. The response rate is the variation (the magnitude of decrease) per unit time in the output of the inverter 13 when the inverter control circuit 14 makes the inverter 13 limit the power output.

The command value generating unit 15b generates a current command value, a voltage command value, or a power command value for the inverter 13 in accordance with the limit value and response rate determined by the power curtailment control unit 15a. As used herein, the "limit value" refers to the lower limit value of a command value that varies with time.

On acquiring information that one or more types of power curtailment causes have arisen, the power curtailment control unit 15a associates a limit value and a response rate with each type of power curtailment cause.

If any one of the multiple types (e.g., five types in the example shown in FIG. 3A) of power curtailment causes has arisen (i.e., when the power curtailment control unit 15a acquires information that the single type of power curtailment cause has arisen), the power curtailment control unit 15a determines a limit value and a response rate associated with the single type of power curtailment cause to be values to be actually used by the inverter 13 for power curtailment. That is to say, on acquiring information that the single type of power curtailment cause has arisen, the power curtailment control unit 15a determines a limit value and a response rate according to the specifics of the single type of power curtailment cause. More specifically, the power curtailment control unit 15a determines a limit value and a response rate associated with the single type of power curtailment cause to be values for use in power curtailment by the inverter 13. The command value generating unit 15b outputs command values, corresponding to the limit value and response rate determined by the power curtailment control unit 15a, to the inverter control circuit 14. The inverter control circuit 14 makes the inverter 13 limit the power output in accordance with the command values.

The multiple types of power curtailment causes may be associated by the power curtailment control unit 15a with the limit values and response rates in the following manner, for example.

The limit value associated with the remote output instruction is a value specified (instructed) by the grid-operating company. The response rate associated with the remote output instruction depends on the instruction given by the grid-operating company but is usually lower than the response rate when the output voltage increases.

When the power curtailment control unit 15a acquires information that the abnormally high temperature has arisen as the single type of power curtailment cause, the inverter control circuit 14 makes the inverter 13 reduce its output current and power output at the specified response rate until the temperature in the first power converter 10 falls to a target value (e.g., 80° C.) or less. In this case, if the system control circuit 15 does not find the temperature in the first power converter 10 equal to or lower than the target value when the inverter 13 limits the power output to the limit value that has been determined once, then the power curtailment control unit 15a updates the limit value into an even smaller value. As can be seen, the limit value and response rate associated with each type of power curtailment cause may also be values that vary during, before, or after the power curtailment by the inverter 13. The response rate associated with the abnormally high temperature is a rate at which it takes a few minutes for the output to be settled at the limit value since the inverter 13 has started limiting the power output.

The limit value associated with the current rating exceeded is the current rating of the inverter 13. Optionally, at this time, a current value obtained by subtracting a margin from the current rating may also be used as the limit value. The limit value associated with the power rating exceeded is the power rating of the inverter 13. Optionally, at this time, a power value obtained by subtracting a margin from the power rating may also be used as the limit value.

The limit value associated with the output voltage increased may be 225 V in the case of three phases and may be 107 V in the case of a single phase, for example. When the power curtailment control unit 15a acquires information that the output voltage increase has arisen as a single type of power curtailment cause, the inverter control circuit 14 makes the inverter 13 reduce its output current and power output at the specified response rate until the output voltage of the inverter 13 falls to the limit value.

In a situation where the second power converter 20 is connected to the DC bus 40, the multiple types of power curtailment causes that may arise further include a reverse power flow to the grid 4. The power curtailment control unit 15a determines a limit value and a response rate according to the specifics of the type of power curtailment cause by reference to the table shown in FIG. 3B.

The limit value associated with the reverse power flow to the grid 4 includes the output current value and output power value of the inverter 13 when the power output to the grid 4 becomes equal to or less than 0 W. In this case, the power when a current flows from the inverter 13 toward the grid 4 is supposed to be positive (greater than 0 W), the power when a current flows from the inverter 13 toward the DC bus 40 is supposed to be negative (less than 0 W), and the power when no current flows from the inverter 13 is supposed to be zero. The limit value associated with the reverse power flow to the grid 4 varies according to the power consumption of the load 5. The limit value associated with the reverse power flow to the grid 4 is set at a provisional setting. If the reverse power flow to the grid 4 has been generated, then the inverter 13 continues limiting the power output at least until the provisional setting is reached. The response rate associated with the reverse power flow to the grid 4 is a rate at which the power output to the grid 4 decreases to 0 W or less within 500 ms.

In the following description, when compared with each other, a plurality of limit values are supposed to be compared after having been converted into the same unit (such as [W] that is the unit of power). Likewise, in the following description, when compared with each other, a plurality of response rates are supposed to be compared after having been converted into the same unit (such as [W/s]).

The response rate associated with the reverse power flow to the grid 4 is higher than the response rate associated with the current rating exceeded or the response rate associated with the power rating exceeded. The response rate associated with the reverse power flow to the grid 4 is the highest response rate among a plurality of response rates associated with the multiple types of power curtailment causes shown in FIG. 3B. The response rate associated with the current rating exceeded and the response rate associated with the power rating exceeded are higher than the response rate associated with the output voltage increased. The response rate associated with the output voltage increased is higher than the response rate associated with the abnormally high temperature.

In addition, each of the multiple types of power curtailment causes is associated with the amount of time in which the inverter 13 starts limiting the power output since the power curtailment control unit 15a has acquired information that a type of power curtailment cause has arisen. If the power curtailment control unit 15a acquires information that two or more types of power curtailment causes have arisen, the inverter control circuit 14 makes the inverter 13 start limiting the power output when it is about time that the power curtailment associated any one of the two or more causes was started.

If two or more of the multiple types of power curtailment causes have arisen simultaneously, then the power curtailment control unit 15a determines the maximum degree of power curtailment, out of two or more degrees of power curtailment associated with the two or more types of power curtailment causes, to be a value for use in the power curtailment by the inverter 13. That is to say, when acquiring information that the two or more types of power curtailment causes have arisen, the power curtailment control unit 15a determines the maximum degree of power curtailment, out of the two or more degrees of power curtailment associated with the two or more types of power curtailment causes, to be the degree of power curtailment when the inverter control circuit 14 makes the inverter 13 limit the power output.

In addition, the power curtailment control unit 15a also determines the highest rate, out of a plurality of rates (response rates) associated with the two or more types of power curtailment causes, to be the response rate when the inverter 13 limits the power output. That is to say, when acquiring information that the two or more types of power curtailment causes have arisen, the power curtailment control unit 15a determines the highest rate, out of two or more rates (response rates) associated with the two or more types of power curtailment causes, to be the response rate.

This allows the power output to be limited to the maximum degree of power curtailment and at the highest response rate without making the degree of power curtailment and response rates less than any of the degrees of power curtailment and response rates associated with the respective types of power curtailment causes that have arisen.

Figure 4:
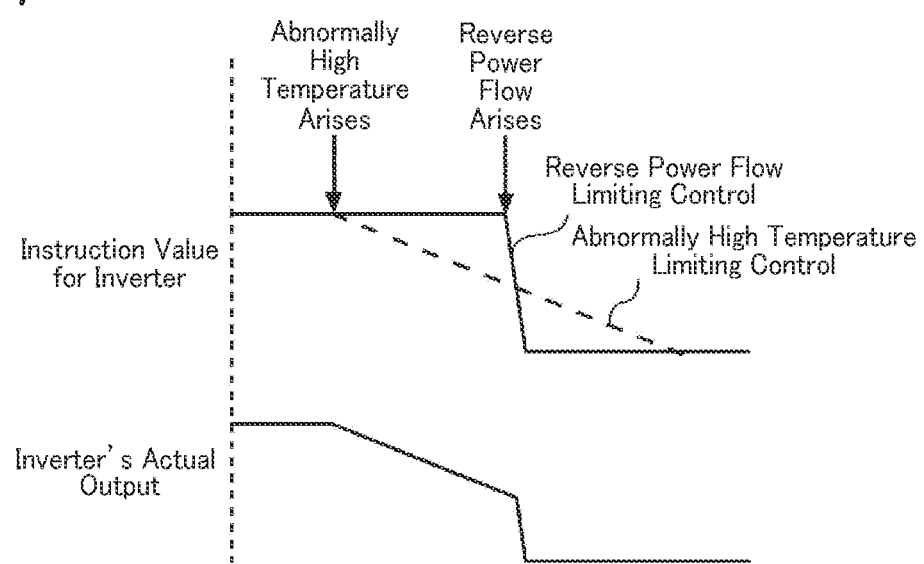
FIG. 4 shows exemplary command value for the inverter and inverter output when multiple types of power curtailment causes have arisen at the same time.

FIG. 4 shows exemplary command value for the inverter 13 and exemplary output of the inverter 13 when multiple types of power curtailment causes have arisen simultaneously. The inverter control circuit 14 controls the inverter 13 in accordance with the command value for the inverter 13 (hereinafter simply referred to as a "command value"). In FIG. 4, the command value and the output are shown on a power basis. The command values plotted by the dotted line indicate how the command value varies in a situation where the abnormally high temperature has arisen as a single type of power curtailment cause and abnormally high temperature limiting control (i.e., power curtailment associated with the abnormally high temperature) is performed. The command values plotted by the solid line indicate how the command value varies in a situation where the reverse power flow has arisen as a single type of power curtailment cause and reverse power flow limiting control (i.e., power curtailment associated with the reverse power flow) is performed. If only the abnormally high temperature has arisen among the multiple types of power curtailment causes, the inverter control circuit 14 makes the inverter 13 limit the power output based on a single command value associated with the abnormally high temperature. If only the reverse power flow has arisen among the multiple types of power curtailment causes, the inverter control circuit 14 makes the inverter 13 limit the power output based on a single command value associated with the reverse power flow.

If two or more types of power curtailment causes have arisen among the multiple types of power curtailment causes, then the power curtailment control unit 15a selects the lower command value at each point in time. The inverter control circuit 14 makes the inverter 13 limit the power output based on the command value selected by the power curtailment control unit 15a at each point in time (hereinafter referred to as a "selected command value"). The actual response rate of the inverter 13 is a response rate associated with the abnormally high temperature at least between a point in time when the abnormally high temperature has arisen and a point in time when the reverse power flow has arisen. Once the command value associated with the reverse power flow has become less than the command value associated with the abnormally high temperature after the reverse power flow has arisen, the response rate will be a rate associated with the reverse power flow.

In this case, the limit value associated with the abnormally high temperature is supposed to be less than the limit value associated with the reverse power flow. That is to say, if the inverter 13 limits the power output to the limit value associated with the reverse power flow, then the temperature in the first power converter 10 is supposed to be greater than a target value and the limit value associated with the abnormally high temperature is supposed to be less than the limit value associated with the reverse power flow. In that case, after the reverse power flow has been eliminated, the power curtailment associated with the abnormally high temperature is carried on. That is to say, the inverter control circuit 14 makes the inverter 13 limit the power output at a response rate associated with the abnormally high temperature until the output of the inverter 13 reaches a limit value associated with the abnormally high temperature.

Figure 8:
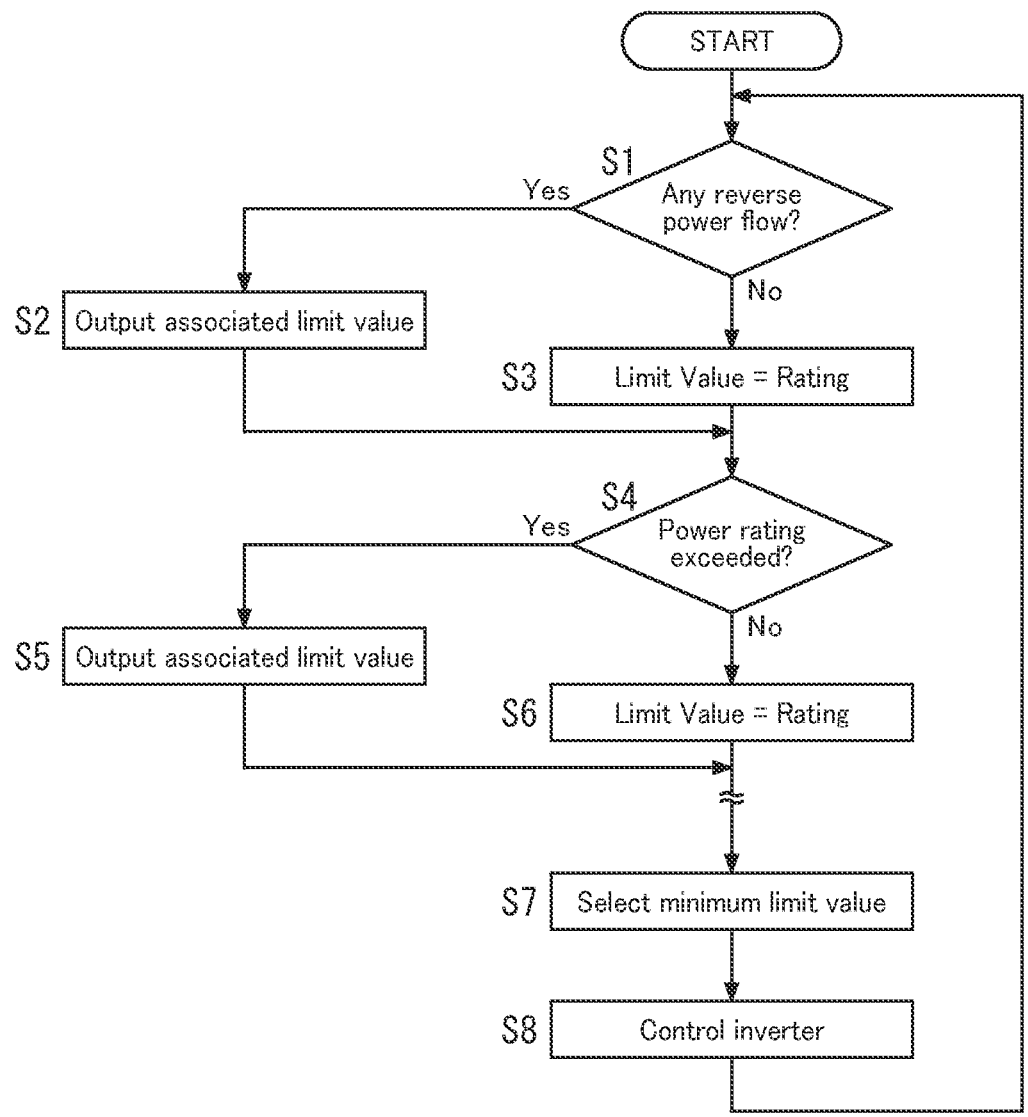
FIG. 8 is a flowchart showing the procedure of a method for controlling a converter circuit in the power conversion system.

Such power curtailment control is to be performed by the inverter 13 from one, two or more types of power curtailment causes using the power curtailment control unit 15a as shown in FIGS. 5 and 8. The processing flow of the power curtailment control unit 15a remains the same no matter whether the number of the types of power curtailment causes that have arisen is one or two or more. The power curtailment control unit 15a includes: decision units 121-125, each calculating, based on an associated type of power curtailment cause, a limit value in view of the response time limit; a selection unit 126 for selecting one limit value from a plurality of limit values corresponding one to one to the multiple types of power curtailment causes; a conversion unit 127 for converting the power-value-based limit value selected by the selection unit 126 into a limit value based on a current peak value; and a limiting unit 128.

The decision units 121-125 are a reverse power flow decision unit 121, a power rating decision unit 122, a voltage increase decision unit 123, a remote output decision unit 124, and a temperature increase decision unit 125, respectively.

When acquiring information that a reverse power flow has arisen (if the answer is YES in Step S1), the reverse power flow decision unit 121 outputs a limit value Pc1 associated with the "reverse power flow" as a type of power curtailment cause (in Step S2). On the other hand, when not acquiring information that a reverse power flow has arisen (if the answer is NO in Step S1), the reverse power flow decision unit 121 outputs the power rating of the inverter 13 as a limit value Pc1 (in Step S3).

When acquiring information that the output power (or output current) of the inverter 13 has exceeded the power rating (or current rating) (if the answer is YES in Step S4), the power rating decision unit 122 outputs a limit value Pc2 associated with the "power rating (current rating) exceeded" as a type of power curtailment cause (in Step S5). On the other hand, when not acquiring information that the output power (or output current) of the inverter 13 has exceeded the power rating (or current rating) (if the answer is NO in Step S4), the power rating decision unit 122 outputs the power rating (or current rating) of the inverter 13 as a limit value Pc2 (in Step S6).

Although not shown in FIG. 8, when acquiring information that the voltage of the grid 4 is higher than a predetermined value (e.g., an effective value of 106 V), the voltage increase decision unit 123 outputs a limit value Pc3 associated with the "output voltage increased" as a type of power curtailment cause. On the other hand, when acquiring information that the voltage of the grid 4 is lower than the predetermined value, the voltage increase decision unit 123 outputs the voltage rating of the inverter 13 as a limit value Pc3.

Although not shown in FIG. 8, when receiving an external instruction to limit power output (e.g., directly instructed to limit power output or given a schedule to limit power output), the remote output decision unit 124 outputs a limit value Pc4 associated with the "remote output instruction" as a type of power curtailment cause. On the other hand, when receiving no external instruction, the remote output decision unit 124 outputs the power rating of the inverter 13 as a limit value Pc4.

Although not shown in FIG. 8, when finding the temperature, measured at a predetermined site by the temperature sensor T1 (see FIG. 1), in the first power converter 10 greater than a predetermined value, the temperature increase decision unit 125 outputs a limit value Pc5 associated with the "abnormally high temperature" as a type of power curtailment cause. On the other hand, when finding the temperature at the predetermined site in the first power converter 10 less than the predetermined value, the temperature increase decision unit 125 outputs the power rating of the inverter 13 as a limit value Pc5.

The unit of the limit values Pc1-Pc5 may be power [W], for example. That is to say, even though the physical quantities to be controlled based on the limit value include the output current, output voltage, and output power of the inverter 13, the limit values Pc1-Pc5 are output as values converted into power values.

The limit values Pc1-Pc5 are provided from the respective decision units 121-125 to the selection unit 126. The selection unit 126 includes selectors. The selection unit 126 selects the minimum value (i.e., a value with the largest degree of power curtailment) from the respective limit values Pc1-Pc5 provided (in Step S7) and outputs the limit value thus selected to the conversion unit 127.

The conversion unit 127 receives not only the limit value selected by the selection unit 126 but also the effective value of the voltage of the grid 4. The conversion unit 127 converts the power-based limit value into a value based on a current peak value, and outputs the latter value as a provisional upper limit value for the output current of the inverter 13 to the limiting unit 128.

When finding the provisional upper limit value for the output current of the inverter 13 falling outside of a predetermined range (e.g., a value greater than the current rating of the inverter 13), the limiting unit 128 determines an upper limit value such that the provisional upper limit value falls within the predetermined range and outputs the value as an upper limit value Iitc to the limiter 112 of the command value generating unit 15b. On the other hand, when finding the provisional upper limit value for the output current of the inverter 13 falling within the predetermined range, the limiting unit 128 outputs the provisional upper limit value for the output current of the inverter 13 as an upper limit value Iitc to the limiter 112 of the command value generating unit 15b. The inverter control circuit 14 makes the inverter 13 operate with its output limited to the upper limit value Iit2 or less (in Step S8). Thus, the inverter control circuit 14 makes the inverter 13 limit the power output to the maximum degree of power curtailment, out of one or more degrees of power curtailment associated with one or more types of power curtailment causes that have arisen, among the multiple types of power curtailment causes.

Although not shown, as for the response rate, the power curtailment control unit 15a also performs processing similar to the limit value (degree of power curtailment) to select the highest response rate and output the response rate thus selected to the command value generating unit 15b. That is to say, when acquiring information that a type of power curtailment cause has arisen, each of the decision units 121-125 outputs a response rate associated with the type of power curtailment cause that has arisen. On the other hand, when not acquiring information that a type of power curtailment cause has arisen, each of the decision units 121-125 outputs the minimum value of the response rate. As used herein, the "minimum value of response rate" refers to a response rate when the inverter 13 limits the power output at the lowest possible response rate.

The response rates are provided from the respective decision units 121-125 to the selection unit 126. The selection unit 126 selects the maximum value (corresponding to the highest response rate) from the respective response rates provided and outputs the response rate thus selected to the command value generating unit 15b.

As can be seen from the foregoing description, according to this embodiment, the degree of power curtailment and response rate for the inverter 13 are determined according to the specifics of one or more types of power curtailment causes that have arisen, thus ensuring degrees of power curtailment and response rates required for the respective types of power curtailment causes. This allows an adequate power balance to be struck between the input and output of the power conversion system 1 as a whole.

In addition, adding or removing the reverse power flow to the grid 4 to/from the multiple types of power curtailment causes depending on whether the second power converter 20 connected to the storage battery unit 3 is connected or not allows the power curtailment control to be optimized according to the system configuration.

Although an embodiment of the present disclosure has been described, it should be appreciated by one of ordinary skill in the art that the embodiment described above is only an exemplary one of various embodiments of the present disclosure and should not be construed as limiting and that the combination of the respective constituent elements and processing steps described above may be readily modified in various manners without departing from the scope of the present disclosure.

First Variation of Exemplary Embodiment

Figure 9:
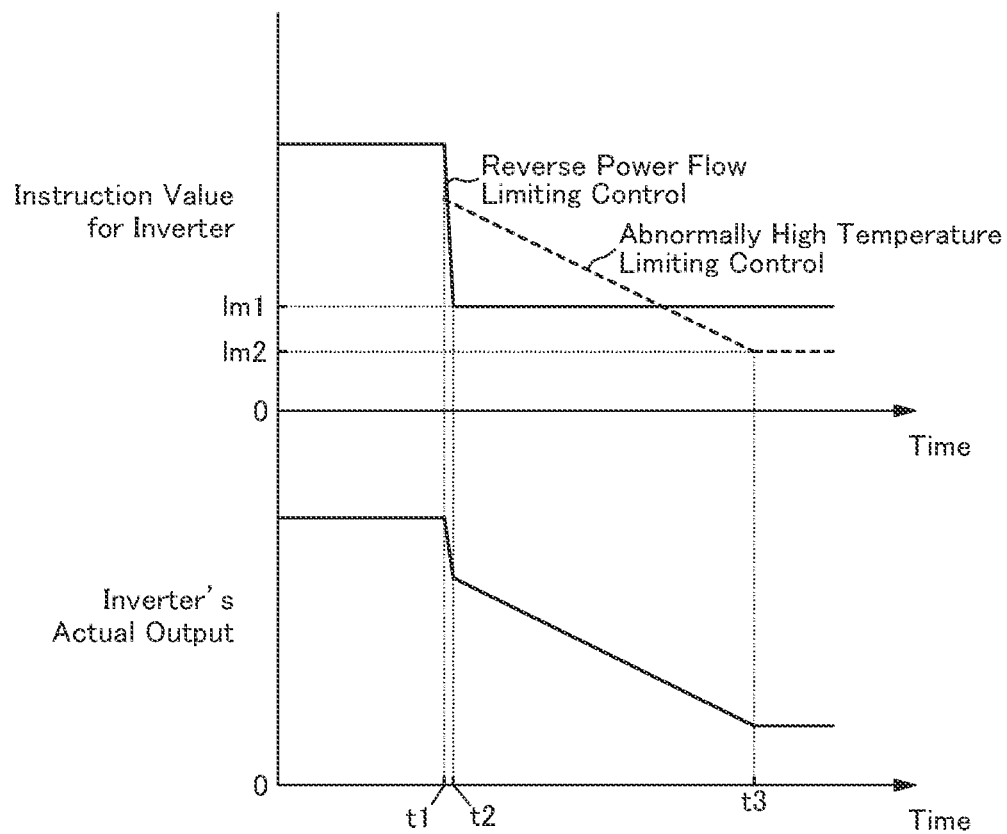
FIG. 9 shows exemplary command value for the inverter and inverter output when multiple types of power curtailment causes have arisen at the same time in a power conversion system according to a first variation of the exemplary embodiment of the present disclosure.

Next, a first variation of the exemplary embodiment will be described with reference to FIG. 9. In the following description, any constituent element of the first variation, having the same function as a counterpart of the exemplary embodiment described above, will be designated by the same reference numeral as that counterpart's, and description thereof will be omitted herein.

When acquiring information that two or more types of power curtailment causes have arisen, the power curtailment control unit 15a sets the response rate at a rate associated with the specifics of a particular type of power curtailment cause out of the two or more types of power curtailment causes that makes the limit value minimum (i.e., makes the degree of power curtailment maximum) when the particular type of power curtailment cause arises by itself. That is to say, the power curtailment control unit 15a sets the response rate associated with the particular type of power curtailment that has arisen by itself less than (i.e., sets the degree of power curtailment associated therewith greater than) the response rate (or degree of power curtailment) associated with any other one of the multiple types of power curtailment causes that has arisen by itself. As an example, a situation where the power curtailment control unit 15a has acquired information that reverse power flow and abnormally high temperature have arisen as the type of power curtailment causes as shown in FIG. 9 will be described.

When reverse power flow arises at a time t1 as single type of power curtailment cause, the inverter control circuit 14 makes the inverter 13 limit the power output in accordance with a command value associated with the reverse power flow. This makes the response rate associated with the reverse power flow.

When abnormally high temperature arises at a time t2 later than the time t1, the power curtailment control unit 15a compares a limit value lm1 (degree of power curtailment) associated with the reverse power flow with a limit value lm2 (degree of power curtailment) associated with the abnormally high temperature. In the following description, a situation where the limit value lm2 associated with the abnormally high temperature is smaller than the limit value lm1 associated with the reverse power flow (i.e., the former degree of power curtailment is greater than the latter) will be described. Among the limit value lm1 associated with the reverse power flow and the limit value lm2 associated with the abnormally high temperature, the limit value lm2 associated with the abnormally high temperature is minimum (i.e., its degree of power curtailment is maximum). Thus, the power curtailment control unit 15a determines the response rate associated with the abnormally high temperature to be a response rate for use in the power curtailment by the inverter 13. Consequently, from the time t2 when the abnormally high temperature arises and on, the inverter control circuit 14 makes the inverter 13 limit the power output in accordance with the command value associated with the abnormally high temperature and at the response rate associated with the abnormally high temperature. From the time t2 and on, the inverter control circuit 14 makes the inverter 13 limit the power output at the response rate associated with the abnormally high temperature until a point in time t3 when the limit value lm2 associated with the abnormally high temperature is reached.

Other Variations of Exemplary Embodiment

Next, other variations of the exemplary embodiment will be enumerated one after another. Optionally, the variations to be described below may be adopted in combination as appropriate. Alternatively, the variations to be described below may also be combined with the first variation as needed.

In FIG. 1, the inverter control circuit 14 and the system control circuit 15 are illustrated as two separate circuits. However, this is only an example of the present disclosure and should not be construed as limiting. The inverter control circuit 14 and the system control circuit 15 may be implemented as two different microcomputers or may also be implemented as a single microcomputer. Also, in the embodiment described above, the first power converter 10 and the second power converter 20 are supposed to be housed in two different housings. Alternatively, the first power converter 10 and second power converter 20 may be housed in a single housing and the system control circuit 15 and the converter control circuit 22 may be connected together via the communications line 42. Such an exemplary configuration also falls within the scope of an exemplary embodiment of the present disclosure.

The power conversion system 1 according to the present disclosure includes a computer system. In that case, the computer system may include, as principal hardware components, a processor and a memory. The functions of the power conversion system 1 and method for controlling the converter circuit 100 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). As used herein, the "integrated circuit" such as an IC or an LSI is called by a different name depending on the degree of integration thereof. Examples of the integrated circuits include a system LSI, a very largescale integrated circuit (VLSI), and an ultra largescale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a largescale integrated circuit.

Also, in the embodiment described above, the plurality of constituent elements (or the functions) of the first power converter 10 are integrated together in a single housing. However, this is only an example and should not be construed as limiting. Alternatively, those constituent elements (or functions) of the first power converter 10 may be distributed in multiple different housings. In the embodiment described above, the plurality of constituent elements (or the functions) of the second power converter 20 are also integrated together in a single housing. However, this is only an example and should not be construed as limiting. Alternatively, those constituent elements (or functions) of the second power converter 20 may also be distributed in multiple different housings. Still alternatively, at least some functions of the power conversion system 1 (e.g., at least some functions of the first power converter 10 or the second power converter 20) may be implemented as a cloud computing system as well.

Conversely, at least one some functions of the power conversion system 1 distributed in multiple devices in the embodiment described above may be aggregated together in a single housing. For example, at least some functions, distributed in the first power converter 10 and the second power converter 20, of the power conversion system 1 may be aggregated together in a single housing.

Also, in the embodiment described above, the system control circuit 15 and the converter control circuit 12 are provided separately from each other. However, this is only an example of the present disclosure and should not be construed as limiting. Alternatively, the system control circuit 15 and the converter control circuit 12 may also be implemented as a single circuit.

Furthermore, in the embodiment described above, the DC-DC converter 11, 21 limits the power output when the bus voltage Vb increases. However, this is only an example of the present disclosure and should not be construed as limiting. Alternatively, the DC-DC converter 11, 21, as well as the inverter 13, for example, may limit the power output when a reverse power flow is generated, when its own output exceeds a current rating or a power rating, when its own output voltage exceeds a predetermined value, when a remote output instruction is received, or when the temperature rises abnormally. Also, the degree of power curtailment and response rate of the DC-DC converter 11, 21 may be determined by the same processing as the one performed when the degree of power curtailment and response rate of the inverter 13 are determined by the system control circuit 15.

Optionally, instead of making the inverter 13 limit the power output, at least one of the DC-DC converter 11 or the DC-DC converter 21 may limit the power output.

In the embodiment described above, the control circuit 101 includes the inverter control circuit 14, the system control circuit 15, the converter control circuit 12, and the converter control circuit 22. However, this is only an example of the present disclosure and should not be construed as limiting. Rather, the control circuit 101 may include at least one of these circuits. For example, the control circuit 101 may include the system control circuit 15 and one or two circuits selected from the group consisting of the inverter control circuit 14, the converter control circuit 12, and the converter control circuit 22.

Optionally, the system control circuit 15 may acquire information about the location of any fault with the power conversion system 1 and may select, according to the location where the fault has been detected, a constituent element in charge of limiting the power output in the converter circuit 100. For example, if the system control circuit 15 has detected any fault with the solar cell 2 or the DC-DC converter 11, then the system control circuit 15 may make the DC-DC converter 11 limit the power output. Alternatively, if the system control circuit 15 has detected any fault with the storage battery unit 3 or the DC-DC converter 21, for example, then the system control circuit 15 may make the DC-DC converter 21 limit the power output. Still alternatively, if the system control circuit 15 has detected any fault with the grid 4, the load 5, or the inverter 13, for example, then the system control circuit 15 may make the inverter 13 limit the power output.

Furthermore, in the embodiment described above, the solar cell 2 is connected to the first power converter 10. However, this is only an example of the present disclosure and should not be construed as limiting. Alternatively, a wind power generator, a micro-hydroelectric power generator, or any other type of power generator may be connected to the first power converter 10 instead of the solar cell 2. Furthermore, only one of a power generation facility such as the solar cell 2 or the storage battery unit 3 may be connected to the power conversion system 1.

Resume

The embodiments described above may be a specific implementation of the following aspects of the present disclosure.

A power conversion system 1 according to a first aspect includes a converter circuit 100 and a control circuit 101. The converter circuit 100 includes an inverter 13. The inverter 13 converts DC power into AC power. The converter circuit 100 receives DC power from a DC power supply (such as a solar cell 2 or a storage battery unit 3 3), has the DC power converted into AC power by at least the inverter 13, and outputs the AC power to a load 5 or a power grid (grid 4). The control circuit 101 controls the converter circuit 100. When acquiring information that a single type of power curtailment cause has arisen, the control circuit 101 makes the converter circuit 100 limit power output to a varying degree of power curtailment according to specifics of the single type of power curtailment cause. When acquiring information that two or more types of power curtailment causes have arisen, the control circuit 101 makes the converter circuit 100 limit power output to a maximum degree of power curtailment out of two or more degrees of power curtailment according to respective specifics of the two or more types of power curtailment causes.

This configuration allows the power curtailment control to be performed properly, no matter what type of power curtailment cause has arisen among various types of causes. That is to say, if a single type of power curtailment cause has arisen, the degree of power curtailment by the converter circuit 100 is determined to be a degree of power curtailment associated with the single type of power curtailment cause. Meanwhile, if two or more types of power curtailment causes have arisen, the degree of power curtailment by the converter circuit 100 is not less than any of two or more degrees of power curtailment associated with the two or more types of power curtailment causes. This allows the power conversion system 1 to limit the power output with increased reliability.

In a power conversion system 1 according to a second aspect, which may be implemented in conjunction with the first aspect, the control circuit 101 makes at least the inverter 13 limit the power output.

This configuration makes the inverter 13 limit the power output if a type of power curtailment cause has arisen in the inverter 13, thus increasing responsivity to any type of power curtailment cause that has arisen, compared to a situation where power output is limited by a component other than the inverter 13.

In a power conversion system 1 according to a third aspect, which may be implemented in conjunction with the first or second aspect, the converter circuit 100 includes a DC-DC converter 11 (or 21). The DC-DC converter 11 (or 21) converts the DC power supplied from the DC power supply (such as the solar cell 2 or the storage battery unit 3) and outputs the DC power thus converted o the inverter 13. The control circuit 101 makes at least the DC-DC converter 11 (or 21) limit the power output.

This configuration makes the DC-DC converter 11 (or 21) limit the power output if a type of power curtailment cause has arisen in the DC-DC converter 11 (or 21), thus increasing the responsivity to any type of power curtailment cause that has arisen, compared to a situation where only the inverter 13 limits the power output.

In a power conversion system 1 according to a fourth aspect, which may be implemented in conjunction with the third aspect, the control circuit 101 makes the DC-DC converter 11 (or 21) limit the power output according to voltage on a DC bus 40. The DC bus 40 serves as a line to connect the DC-DC converter 11 (or 21) to the inverter 13.

This configuration reduces an increase in voltage on the DC bus 40.

In a power conversion system 1 according to a fifth aspect, which may be implemented in conjunction with any one of the first to fourth aspects, when acquiring information that a single type of power curtailment cause has arisen, the control circuit 101 sets a response rate at a rate to be determined according to the specifics of the single type of power curtailment cause. The response rate is a variation per unit time in power output of the converter circuit 100 when the control circuit 101 makes the converter circuit 100 limit the power output. When acquiring information that two or more types of power curtailment causes have arisen, the control circuit 101 sets the response rate at a maximum rate out of two or more rates according to the respective specifics of the two or more types of power curtailment causes.

According to this configuration, if a single type of power curtailment cause has arisen, the response rate of the converter circuit 100 is a response rate associated with the single type of power curtailment cause. On the other hand, if two or more types of power curtailment causes have arisen, then the response rate of the converter circuit 100 is not less than any of the two or more response rates associated with the two or more types of power curtailment causes. This allows the power conversion system 1 to limit the power output with increased reliability.

In a power conversion system 1 according to a sixth aspect, which may be implemented in conjunction with any one of the first to fourth aspects, when acquiring information that a single type of power curtailment cause has arisen, the control circuit 101 sets a response rate at a rate to be determined according to the specifics of the single type of power curtailment cause. The response rate is a variation per unit time in power output of the converter circuit 100 when the control circuit 101 makes the converter circuit 100 limit the power output. When acquiring information that two or more types of power curtailment causes have arisen, the control circuit 101 sets the response rate at a rate according to specifics of a particular one of the two or more types of power curtailment causes. A degree of power curtailment corresponding to the particular type of power curtailment cause that has arisen by itself is greater than a degree of power curtailment corresponding to any other one of the two or more types of power curtailment causes, each of which has arisen by itself.

According to this configuration, the degree of power curtailment when the control circuit 101 makes the converter circuit 100 limit power output and the response rate are associated with a common type of power curtailment cause. This lightens the processing load on a circuit for selecting the degree of power curtailment and response rate (e.g., power curtailment control unit 15a according to an exemplary embodiment), compared to a situation where the degree of power curtailment and response rate are associated with mutually different types of power curtailment causes.

In a power conversion system 1 according to a seventh aspect, which may be implemented in conjunction with any one of the first to sixth aspects, when acquiring information that a single type of power curtailment cause has arisen, the control circuit 101 sets a response rate at a rate to be determined according to the specifics of the single type of power curtailment cause. The response rate is a variation per unit time in power output of the converter circuit 100 when the control circuit 101 makes the converter circuit 100 limit the power output. Types of the power curtailment causes include a reverse power flow to the power grid (grid 4) and excess of the DC power or AC power output by the converter circuit 100 over a power rating. The response rate set by the control circuit 101 when the control circuit 101 acquires information that the reverse power flow to the power grid (grid 4) has arisen as the single type of power curtailment cause is higher than the response rate set by the control circuit 101 when the control circuit 101 acquires information that the excess of the DC power or AC power output by the converter circuit 100 over the power rating has arisen as the single type of power curtailment cause.

This configuration allows the reverse power flow, if any, to be eliminated quickly.

A power conversion system 1 according to an eighth aspect includes a first power converter 10 and a second power converter 20. The first power converter 10 includes an inverter 13 and a DC bus 40. The inverter 13 converts DC power supplied from a storage battery unit 3 into AC power and outputs the AC power to a load 5 or a power grid (grid 4). The DC bus 40 serves as a line connected to the inverter 13. The second power converter 20 includes a DC-DC converter 21. The DC-DC converter 21 is connected between the storage battery unit 3 and the DC bus 40. The DC-DC converter 21 charges and discharges the storage battery unit 3. At least one of the first power converter 10 or the second power converter 20 includes at least a part of a control circuit 101. The control circuit 101 controls a converter circuit 100 including the inverter 13 and the DC-DC converter 21. When acquiring information that a single type of power curtailment cause has arisen, the control circuit 101 makes the converter circuit 100 limit power output to a varying degree of power curtailment according to specifics of the single type of power curtailment cause. When acquiring information that two or more types of power curtailment causes have arisen, the control circuit 101 makes the converter circuit 100 limit power output to a maximum degree of power curtailment out of two or more degrees of power curtailment according to respective specifics of the two or more types of power curtailment causes.

This configuration allows the power curtailment control to be performed properly, no matter what type of power curtailment cause has arisen among various types of causes. That is to say, if a single type of power curtailment cause has arisen, the degree of power curtailment by the converter circuit 100 is determined to be a degree of power curtailment, associated with the single type of power curtailment cause. Meanwhile, if two or more types of power curtailment causes have arisen, the degree of power curtailment by the converter circuit 100 is not less than any of two or more degrees of power curtailment associated with the two or more types of power curtailment causes. This allows the power conversion system 1 to limit the power output with increased reliability.

A method for controlling a converter circuit 100 according to a ninth aspect is a method for controlling a converter circuit 100 including an inverter 13 to convert DC power into AC power. The converter circuit 100 receives DC power from a DC power supply (such as a solar cell 2 or a storage battery unit 3), has the DC power converted into AC power by at least the inverter 13, and outputs the AC power to a load 5 or a power grid (grid 4). The method for controlling the converter circuit 100 includes the steps of: making, when acquiring information that a single type of power curtailment cause has arisen, the converter circuit 100 limit power output to a varying degree of power curtailment according to specifics of the single type of power curtailment cause; and making, when acquiring information that two or more types of power curtailment causes have arisen, the converter circuit 100 limit power output to a maximum degree of power curtailment out of two or more degrees of power curtailment according to respective specifics of the two or more types of power curtailment causes.

This configuration allows the power curtailment control to be performed properly by the converter circuit 100, no matter what type of power curtailment cause has arisen among various types of causes.

A program according to a tenth aspect is designed to cause a computer system to perform the method for controlling a converter circuit 100 described above.

This configuration allows the power curtailment control to be performed properly by the converter circuit 100, no matter what type of power curtailment cause has arisen among various types of causes.

REFERENCE SIGNS LIST

1 Power Conversion System
T1 Temperature Sensor
2 Solar Cell
3 Storage Battery unit 4 Grid
5 Load
10 First Power Converter
11 DC-DC Converter
12 Converter Control Circuit
13 Inverter
14 Inverter Control Circuit
15 System Control Circuit
20 Second Power Converter
21 DC-DC Converter
22 Converter Control Circuit
40 DC Bus
41, 42 Communications Line
50 Power Line
100 Converter Circuit
101 Control Circuit

The invention claimed is:
1. A power conversion system comprising:
a converter circuit including an inverter configured to convert DC power into AC power, the converter circuit being configured to receive DC power from a DC power supply, have the DC power converted into AC power by at least the inverter, and output the AC power to a load or a power grid; and
a control circuit configured to control the converter circuit,
the control circuit being configured to, when acquiring information that a single type of power curtailment cause has arisen, make the converter circuit limit power output to a varying degree of power curtailment according to specifics of the single type of power curtailment cause,
the control circuit being configured to, when acquiring information that two or more types of power curtailment causes have arisen, make the converter circuit limit power output to a maximum degree of power curtailment out of two or more degrees of power curtailment according to respective specifics of the two or more types of power curtailment causes,
the control circuit being configured to, when acquiring information that a single type of power curtailment cause has arisen, set a response rate at a rate to be determined according to the specifics of the single type of power curtailment cause, the response rate being a variation per unit time in power output of the converter circuit when the control circuit makes the converter circuit limit the power output,
the control circuit being configured to, when acquiring information that two or more types of power curtailment causes have arisen, set the response rate at a maximum rate out of two or more rates according to the respective specifics of the two or more types of power curtailment causes.
2. The power conversion system of claim 1, wherein the control circuit is configured to make at least the inverter limit the power output.
3. The power conversion system of claim 1, wherein
the converter circuit includes a DC-DC converter configured to convert the DC power supplied from the DC power supply and output the DC power thus converted to the inverter, and
the control circuit is configured to make at least the DC-DC converter limit the power output.
4. The power conversion system of claim 3, wherein the control circuit is configured to make the DC-DC converter limit the power output according to voltage on a DC bus serving as a line to connect the DC-DC converter to the inverter.
5. A power conversion system comprising:
a converter circuit including an inverter configured to convert DC power into AC power, the converter circuit being configured to receive DC power from a DC power supply, have the DC power converted into AC power by at least the inverter, and output the AC power to a load or a power grid; and
a control circuit configured to control the converter circuit,
the control circuit being configured to, when acquiring information that a single type of power curtailment cause has arisen, make the converter circuit limit power output to a varying degree of power curtailment according to specifics of the single type of power curtailment cause,
the control circuit being configured to, when acquiring information that two or more types of power curtailment causes have arisen, make the converter circuit limit power output to a maximum degree of power curtailment out of two or more degrees of power curtailment according to respective specifics of the two or more types of power curtailment causes,
the control circuit being configured to, when acquiring information that a single type of power curtailment cause has arisen, set a response rate at a rate to be determined according to the specifics of the single type of power curtailment cause, the response rate being a variation per unit time in power output of the converter circuit when the control circuit makes the converter circuit limit the power output,
the control circuit being configured to, when acquiring information that two or more types of power curtailment causes have arisen, set the response rate at a rate according to specifics of a particular one of the two or more types of power curtailment causes,
a degree of power curtailment corresponding to the particular type of power curtailment cause that has arisen by itself being greater than a degree of power curtailment corresponding to any other one of the two or more types of power curtailment causes, each of which has arisen by itself.
6. A power conversion system comprising:
a converter circuit including an inverter configured to convert DC power into AC power, the converter circuit being configured to receive DC power from a DC power supply, have the DC power converted into AC power by at least the inverter, and output the AC power to a load or a power grid; and
a control circuit configured to control the converter circuit,
the control circuit being configured to, when acquiring information that a single type of power curtailment cause has arisen, make the converter circuit limit power output to a varying degree of power curtailment according to specifics of the single type of power curtailment cause,
the control circuit being configured to, when acquiring information that two or more types of power curtailment causes have arisen, make the converter circuit limit power output to a maximum degree of power curtailment out of two or more degrees of power curtailment according to respective specifics of the two or more types of power curtailment causes, the control circuit being configured to, when acquiring information that a single type of power curtailment cause has arisen, set a response rate at a rate to be determined according to the specifics of the single type of power curtailment cause, the response rate being a variation per unit time in power output of the converter circuit when the control circuit makes the converter circuit limit the power output, types of the power curtailment causes including a reverse power flow to the power grid and excess of the DC power or AC power output by the converter circuit over a power rating, the response rate set by the control circuit when the control circuit acquires information that the reverse power flow to the power grid has arisen as the single type of power curtailment cause being higher than the response rate set by the control circuit when the control circuit acquires information that the excess of the DC power or AC power output by the converter circuit over the power rating has arisen as the single type of power curtailment cause.

7. A method for controlling a converter circuit, the converter circuit including an inverter configured to convert DC power into AC power, the converter circuit being configured to receive DC power from a DC power supply, have the DC power converted into AC power by at least the inverter, and output the AC power to a load or a power grid, the method comprising the steps of:

making, when acquiring information that a single type of power curtailment cause has arisen, the converter circuit limit power output to a varying degree of power curtailment according to specifics of the single type of power curtailment cause;

making, when acquiring information that two or more types of power curtailment causes have arisen, the converter circuit limit power output to a maximum degree of power curtailment out of two or more degrees of power curtailment according to respective specifics of the two or more types of power curtailment causes;

setting, when acquiring information that a single type of power curtailment cause has arisen, a response rate at a rate to be determined according to the specifics of the single type of power curtailment cause, the response rate being a variation per unit time in power output of the converter circuit when making the converter circuit limit the power output; and setting, when acquiring information that two or more types of power curtailment causes have arisen, the response rate at a maximum rate out of two or more rates according to the respective specifics of the two or more types of power curtailment causes.

8. A non-transitory storage medium readable for a computer system and storing a program designed to cause the computer system to perform the method for controlling a converter circuit according to claim 7.

9. A method for controlling a converter circuit, the converter circuit including an inverter configured to convert DC power into AC power, the converter circuit being configured to receive DC power from a DC power supply, have the DC power converted into AC power by at least the inverter, and output the AC power to a load or a power grid, the method comprising the steps of:

making, when acquiring information that a single type of power curtailment cause has arisen, the converter circuit limit power output to a varying degree of power curtailment according to specifics of the single type of power curtailment cause;

making, when acquiring information that two or more types of power curtailment causes have arisen, the converter circuit limit power output to a maximum degree of power curtailment out of two or more degrees of power curtailment according to respective specifics of the two or more types of power curtailment causes;

setting, when acquiring information that a single type of power curtailment cause has arisen, a response rate at a rate to be determined according to the specifics of the single type of power curtailment cause, the response rate being a variation per unit time in power output of the converter circuit when making the converter circuit limit the power output; and setting, when acquiring information that two or more types of power curtailment causes have arisen, the response rate at a rate according to specifics of a particular one of the two or more types of power curtailment causes, a degree of power curtailment corresponding to the particular type of power curtailment cause that has arisen by itself being greater than a degree of power curtailment corresponding to any other one of the two or more types of power curtailment causes, each of which has arisen by itself.

10. A non-transitory storage medium readable for a computer system and storing a program designed to cause the computer system to perform the method for controlling a converter circuit according to claim 9.

11. A method for controlling a converter circuit, the converter circuit including an inverter configured to convert DC power into AC power, the converter circuit being configured to receive DC power from a DC power supply, have the DC power converted into AC power by at least the inverter, and output the AC power to a load or a power grid, the method comprising the steps of:

making, when acquiring information that a single type of power curtailment cause has arisen, the converter circuit limit power output to a varying degree of power curtailment according to specifics of the single type of power curtailment cause;

making, when acquiring information that two or more types of power curtailment causes have arisen, the converter circuit limit power output to a maximum degree of power curtailment out of two or more degrees of power curtailment according to respective specifics of the two or more types of power curtailment causes;

setting, when acquiring information that a single type of power curtailment cause has arisen, a response rate at a rate to be determined according to the specifics of the single type of power curtailment cause, the response rate being a variation per unit time in power output of the converter circuit when making the converter circuit limit the power output, types of the power curtailment causes including a reverse power flow to the power grid and excess of the DC power or AC power output by the converter circuit over a power rating; and setting the response rate, when the control circuit acquires information that the reverse power flow to the power grid has arisen as the single type of power curtailment cause, higher than when the control circuit acquires information that the excess of the DC power or AC power output by the converter circuit over the power rating has arisen as the single type of power curtailment cause.

12. A non-transitory storage medium readable for a computer system and storing a program designed to cause the computer system to perform the method for controlling a converter circuit according to claim 11.

\* \* \* \* \*